United States Patent
Cohen et al.

(10) Patent No.: US 11,656,538 B2
(45) Date of Patent: May 23, 2023

(54) FOLDED ZOOM CAMERA MODULE WITH ADAPTIVE APERTURE

(71) Applicant: Corephotonics Ltd., Tel-Aviv (IL)

(72) Inventors: Noy Cohen, Tel Aviv (IL); Ephraim Goldenberg, Ashdod (IL); Michael Scherer, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 295 days.

(21) Appl. No.: 17/104,744

(22) Filed: Nov. 25, 2020

(65) Prior Publication Data

US 2021/0157216 A1    May 27, 2021

Related U.S. Application Data

(60) Provisional application No. 62/939,943, filed on Nov. 25, 2019.

(51) Int. Cl.
| | | |
|---|---|---|
| *H04N 5/335* | (2011.01) | |
| *G03B 17/17* | (2021.01) | |
| *G02B 13/00* | (2006.01) | |
| *H04N 23/55* | (2023.01) | |

(52) U.S. Cl.
CPC ........... *G03B 17/17* (2013.01); *G02B 13/007* (2013.01); *H04N 23/55* (2023.01)

(58) Field of Classification Search
CPC ...................................................... G03B 17/17
See application file for complete search history.

(56) References Cited

U.S. PATENT DOCUMENTS

| | | |
|---|---|---|
| 2,106,752 A | 2/1938 | Land |
| 2,354,503 A | 7/1944 | Arthur |
| 2,378,170 A | 6/1945 | Aklin |
| 2,441,093 A | 5/1948 | Aklin |
| 3,388,956 A | 6/1968 | Eggert et al. |
| 3,524,700 A | 8/1970 | Eggert et al. |
| 3,558,218 A | 1/1971 | Grey |
| 3,864,027 A | 2/1975 | Harada |
| 3,942,876 A | 3/1976 | Betensky |

(Continued)

OTHER PUBLICATIONS

A compact and cost effective design for cell phone zoom lens, Chang et al., Sep. 2007, 8 pages.

(Continued)

*Primary Examiner* — Gary C Vieaux
(74) *Attorney, Agent, or Firm* — Nathan & Associates; Menachem Nathan

(57) ABSTRACT

Systems comprising a folded camera that includes a lens module with a native aperture, the lens module having a height $H_M$, an adaptive aperture located between the native aperture and an optical path folding element, and an adaptive aperture forming mechanism for forming the adaptive aperture, wherein the adaptive aperture forming mechanism has a height $H_{AA}$ not larger than $H_M$, and methods of using same. In various embodiments, the adaptive aperture forming mechanism includes an actuator and at least one pair of blades operative to be moved by the actuator to a plurality of positions to form the adaptive aperture.

33 Claims, 16 Drawing Sheets

(56) References Cited

U.S. PATENT DOCUMENTS

| | | | |
|---|---|---|---|
| 4,134,645 | A | 1/1979 | Sugiyama et al. |
| 4,338,001 | A | 7/1982 | Matsui |
| 4,465,345 | A | 8/1984 | Yazawa |
| 5,000,551 | A | 3/1991 | Shibayama |
| 5,969,869 | A | 10/1999 | Hirai et al. |
| 6,147,702 | A | 11/2000 | Smith |
| 6,169,636 | B1 | 1/2001 | Kreitzer |
| 6,654,180 | B2 | 11/2003 | Ori |
| 7,187,504 | B2 | 3/2007 | Horiuchi |
| 7,206,136 | B2 | 4/2007 | Labaziewicz et al. |
| 7,248,419 | B2 * | 7/2007 | Takahashi ............ G03B 17/17 348/340 |
| 7,515,351 | B2 | 4/2009 | Chen et al. |
| 7,564,635 | B1 | 7/2009 | Tang |
| 7,643,225 | B1 | 1/2010 | Tsai |
| 7,660,049 | B2 | 2/2010 | Tang |
| 7,684,128 | B2 | 3/2010 | Tang |
| 7,688,523 | B2 | 3/2010 | Sano |
| 7,692,877 | B2 | 4/2010 | Tang et al. |
| 7,697,220 | B2 | 4/2010 | Iyama |
| 7,738,186 | B2 | 6/2010 | Chen et al. |
| 7,777,972 | B1 | 8/2010 | Chen et al. |
| 7,813,057 | B2 | 10/2010 | Lin |
| 7,821,724 | B2 | 10/2010 | Tang et al. |
| 7,826,149 | B2 | 11/2010 | Tang et al. |
| 7,826,151 | B2 | 11/2010 | Tsai |
| 7,869,142 | B2 | 1/2011 | Chen et al. |
| 7,898,747 | B2 | 3/2011 | Tang |
| 7,916,401 | B2 | 3/2011 | Chen et al. |
| 7,918,398 | B2 | 4/2011 | Li et al. |
| 7,957,075 | B2 | 6/2011 | Tang |
| 7,957,076 | B2 | 6/2011 | Tang |
| 7,957,079 | B2 | 6/2011 | Tang |
| 7,961,406 | B2 | 6/2011 | Tang et al. |
| 8,000,031 | B1 | 8/2011 | Tsai |
| 8,004,777 | B2 | 8/2011 | Sano et al. |
| 8,077,400 | B2 | 12/2011 | Tang |
| 8,149,523 | B2 | 4/2012 | Ozaki |
| 8,218,253 | B2 | 7/2012 | Tang |
| 8,228,622 | B2 | 7/2012 | Tang |
| 8,233,224 | B2 | 7/2012 | Chen |
| 8,253,843 | B2 | 8/2012 | Lin |
| 8,279,537 | B2 | 10/2012 | Sato |
| 8,363,337 | B2 | 1/2013 | Tang et al. |
| 8,395,851 | B2 | 3/2013 | Tang et al. |
| 8,400,717 | B2 | 3/2013 | Chen et al. |
| 8,451,549 | B2 | 5/2013 | Yamanaka et al. |
| 8,462,418 | B1 * | 6/2013 | Gat .................... G03B 9/36 396/510 |
| 8,503,107 | B2 | 8/2013 | Chen et al. |
| 8,514,502 | B2 | 8/2013 | Chen |
| 8,570,668 | B2 | 10/2013 | Takakubo et al. |
| 8,718,458 | B2 | 5/2014 | Okuda |
| 8,780,465 | B2 | 7/2014 | Chae |
| 8,810,923 | B2 | 8/2014 | Shinohara |
| 8,854,745 | B1 | 10/2014 | Chen |
| 8,958,164 | B2 | 2/2015 | Kwon et al. |
| 9,185,291 | B1 | 11/2015 | Shabtay et al. |
| 9,229,194 | B2 | 1/2016 | Yoneyama et al. |
| 9,235,036 | B2 | 1/2016 | Kato et al. |
| 9,279,957 | B2 | 3/2016 | Kanda et al. |
| 9,438,792 | B2 | 9/2016 | Nakada et al. |
| 9,488,802 | B2 | 11/2016 | Chen et al. |
| 9,568,712 | B2 | 2/2017 | Dror et al. |
| 9,678,310 | B2 | 6/2017 | Iwasaki et al. |
| 9,817,213 | B2 | 11/2017 | Mercado |
| 2002/0118471 | A1 | 8/2002 | Imoto |
| 2004/0169772 | A1 * | 9/2004 | Matsui ............ H04N 5/23241 348/E5.025 |
| 2005/0041300 | A1 | 2/2005 | Oshima et al. |
| 2005/0062346 | A1 | 3/2005 | Sasaki |
| 2005/0128604 | A1 | 6/2005 | Kuba |
| 2005/0141103 | A1 | 6/2005 | Nishina |
| 2005/0168840 | A1 | 8/2005 | Kobayashi et al. |
| 2005/0270667 | A1 | 12/2005 | Gurevich et al. |
| 2007/0025713 | A1 * | 2/2007 | Hosono ............ G03B 17/12 348/E5.025 |
| 2007/0229983 | A1 | 10/2007 | Saori |
| 2008/0056698 | A1 | 3/2008 | Lee et al. |
| 2008/0304161 | A1 | 12/2008 | Souma |
| 2009/0002839 | A1 | 1/2009 | Sato |
| 2009/0122423 | A1 | 5/2009 | Park et al. |
| 2009/0141365 | A1 | 6/2009 | Jannard et al. |
| 2009/0225438 | A1 | 9/2009 | Kubota |
| 2010/0165476 | A1 | 7/2010 | Eguchi |
| 2010/0277813 | A1 | 11/2010 | Ito |
| 2011/0001838 | A1 | 1/2011 | Lee |
| 2011/0115965 | A1 | 5/2011 | Engelhardt et al. |
| 2011/0149119 | A1 | 6/2011 | Matsui |
| 2011/0157430 | A1 * | 6/2011 | Hosoya ............ G02B 13/009 348/E5.055 |
| 2011/0188121 | A1 | 8/2011 | Goring et al. |
| 2012/0044582 | A1 * | 2/2012 | Murakami ............ G03B 17/17 359/704 |
| 2012/0069455 | A1 | 3/2012 | Lin et al. |
| 2012/0092777 | A1 | 4/2012 | Tochigi et al. |
| 2012/0105708 | A1 | 5/2012 | Hagiwara |
| 2012/0154929 | A1 | 6/2012 | Tsai et al. |
| 2012/0229920 | A1 | 9/2012 | Otsu et al. |
| 2012/0262806 | A1 | 10/2012 | Huang |
| 2013/0057971 | A1 | 3/2013 | Zhao et al. |
| 2013/0088788 | A1 | 4/2013 | You |
| 2013/0208178 | A1 | 8/2013 | Park |
| 2013/0279032 | A1 | 10/2013 | Suigetsu et al. |
| 2013/0286488 | A1 | 10/2013 | Chae |
| 2014/0022436 | A1 | 1/2014 | Kim et al. |
| 2014/0146216 | A1 | 5/2014 | Okumura |
| 2014/0204480 | A1 | 7/2014 | Jo et al. |
| 2014/0285907 | A1 | 9/2014 | Tang et al. |
| 2014/0293453 | A1 | 10/2014 | Ogino et al. |
| 2014/0362274 | A1 | 12/2014 | Christie et al. |
| 2015/0116569 | A1 | 4/2015 | Mercado |
| 2015/0253543 | A1 | 9/2015 | Mercado |
| 2015/0253647 | A1 | 9/2015 | Mercado |
| 2015/0373252 | A1 | 12/2015 | Georgiev |
| 2015/0373263 | A1 | 12/2015 | Georgiev et al. |
| 2016/0044250 | A1 | 2/2016 | Shabtay et al. |
| 2016/0062084 | A1 | 3/2016 | Chen et al. |
| 2016/0070088 | A1 | 3/2016 | Koguchi |
| 2016/0085089 | A1 | 3/2016 | Hillis et al. |
| 2016/0187631 | A1 | 6/2016 | Choi et al. |
| 2016/0227100 | A1 * | 8/2016 | Liu .................... H04N 5/23248 |
| 2016/0291295 | A1 | 10/2016 | Shabtay |
| 2016/0306161 | A1 | 10/2016 | Harada et al. |
| 2016/0313537 | A1 | 10/2016 | Mercado |
| 2016/0341931 | A1 | 11/2016 | Liu et al. |
| 2016/0353008 | A1 | 12/2016 | Osborne |
| 2017/0102522 | A1 | 4/2017 | Jo |
| 2017/0115471 | A1 | 4/2017 | Shinohara |
| 2017/0160511 | A1 | 6/2017 | Kim et al. |
| 2018/0059365 | A1 | 3/2018 | Bone et al. |
| 2018/0217475 | A1 | 8/2018 | Goldenberg et al. |
| 2018/0224630 | A1 | 8/2018 | Lee et al. |
| 2019/0170965 | A1 | 6/2019 | Shabtay |

OTHER PUBLICATIONS

Consumer Electronic Optics: How small a lens can be? The case of panomorph lenses, Thibault et al., Sep. 2014, 7 pages.
Optical design of camera optics for mobile phones, Steinich et al., 2012, pp. 51-58 (8 pages).
The Optics of Miniature Digital Camera Modules, Bareau et al., 2006, 11 pages.
Modeling and measuring liquid crystal tunable lenses, Peter P. Clark, 2014, 7 pages.
Mobile Platform Optical Design, Peter P. Clark, 2014, 7 pages.
Boye et al., "Ultrathin Optics for Low-Profile Innocuous Imager", Sandia Report, 2009, pp. 56-56.
"Cheat sheet: how to understand f-stops", Internet article, Digital Camera World, 2017.

* cited by examiner

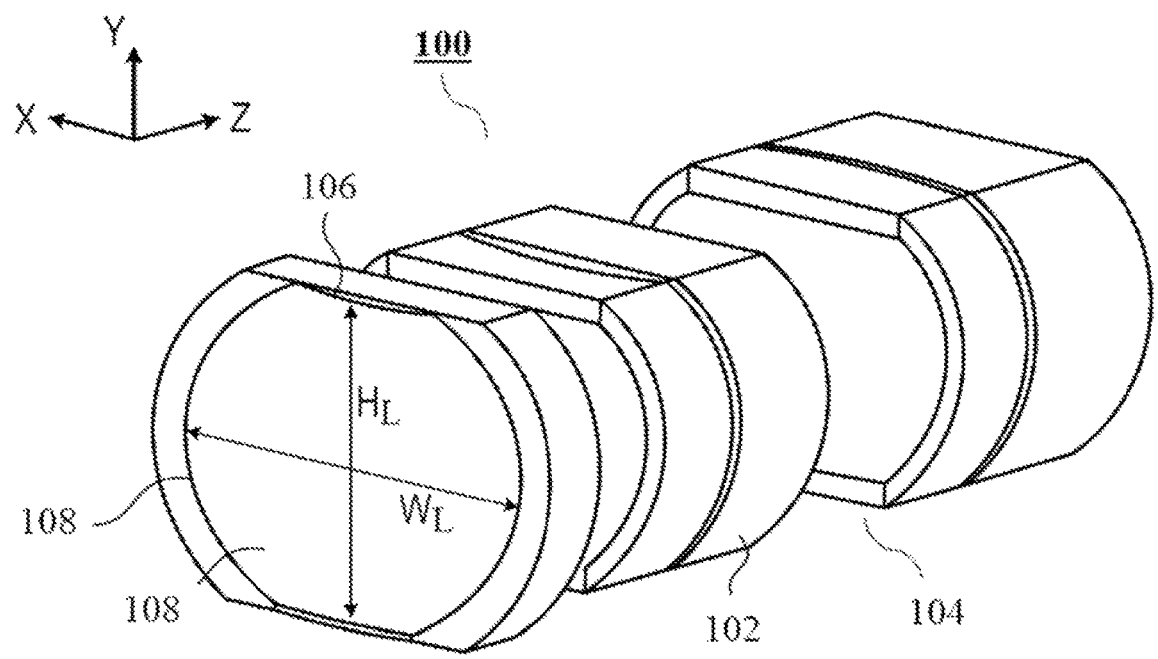
FIG. 1  KNOWN ART
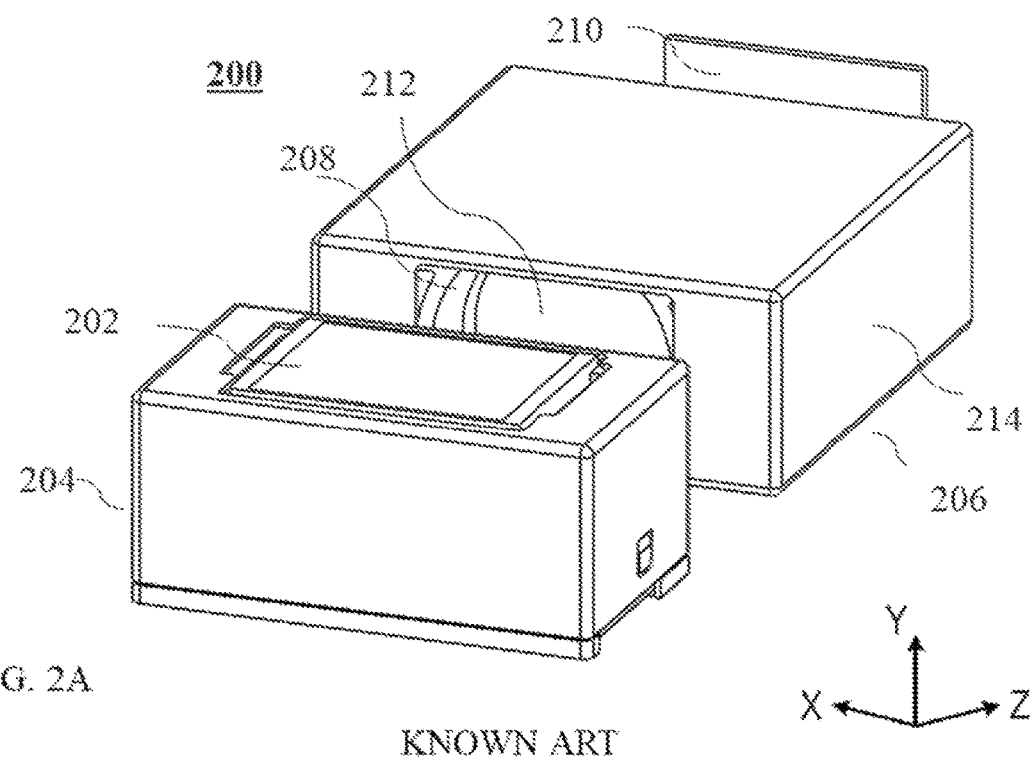
FIG. 2A  KNOWN ART

FOLDED ZOOM CAMERA MODULE WITH ADAPTIVE APERTURE

CROSS-REFERENCE TO RELATED APPLICATIONS

This application claims priority from U.S. Provisional Patent Application No. 62/939,943 filed Nov. 25, 2019, which is incorporated herein by reference in its entirety.

FIELD

Embodiments disclosed herein relate in general to digital cameras, and in particular to thin folded zoom camera modules.

BACKGROUND

Personal computing and/or communication devices (such as smartphones), also referred to as "mobile electronic devices" often have dual-aperture zoom cameras on their backside, in which one camera ("Wide camera") has a "Wide" field of view ($FOV_W$) and the other camera ("Tele camera") has a narrow or "Tele" field of view ($FOV_T$).

FIG. 1 shows a known art optical lens module numbered 100 of a folded Tele camera with a cut lens design, disclosed for example in commonly owned PCT patent application PCT/IB2018/050988. Optical lens module 100 comprises a plurality of lens elements 104, at least some located in a lens barrel 102. Sides 106 in the front view on the lens elements 104 are substantially straight lines along axis X, where the sides 108 are curved. The design shown here that satisfies the condition $H_L<W_L$ is referred to as "cut lens" design, $H_L$ being the height of the lens element and $W_L$ being the width of the lens element. Typically, cut lens ratios $W_L/H_L$ are in the range of 1.1 to 2. Preferably, cut lens ratios $W_L/H_L$ are 1.1 to 1.5.

FIG. 2A shows in perspective a known folded Tele camera 200. Camera 200 comprises an optical path folding element (OPFE) 202 included in an OPFE housing 204, an optical Tele lens module 206 carrying a lens 208, and a Tele image sensor 210. For simplicity, in the following description, the term "Tele" is removed sometimes, leaving e.g. "optical lens module" or just "lens module" and "image sensor" or just "sensor". Optical lens module 206, shown also separately in FIG. 2B, has a "native" (non-adaptive) Tele aperture 212, surrounded by an optical lens module housing 214. As used herein, the term "native aperture" refers to the size and geometry of the aperture of the lens module in the case where there is/are no additional element(s) that act(s) intentionally or unintentionally as aperture, i.e. there is/are no additional element(s) that block(s) light which would have reached the sensor in case of the absence of the element(s). With a cut lens design as in FIG. 1, a low module height $H_M$ can be achieved simultaneously with a large native Tele aperture.

Known folded Tele cameras (also referred to herein as "native" folded Tele cameras) for electronics mobile devices (e.g. smartphones) may have a focal length of e.g. 10 mm-30 mm, and at the same time are able to keep low module height and an aperture as large as possible, beneficial e.g. for imaging in low-light conditions and with high optical resolution. An exemplary aperture diameter may be 6 mm. In folded Tele cameras with a cut Tele lens, the aperture size may range, for example, from 3 mm to 8 mm in width, and more preferably from 6 mm to 7 mm in width.

A folded Tele camera with such a long focal length and with a relatively large aperture may result in an image with a very shallow depth of field (DOF). This may be desired for the purpose of creating optical Bokeh, but may cause a problem in scenes with objects that are spread over a certain range of distances from the cameras, for which it is required to keep all in focus. For example, a folded Tele camera with 30 mm effective focal length (EFL) and a f-number ("f/#") of f/4 ("camera 1"), focusing on an object that is 3 m away, will have an object-side DOF of about 10 cm (assuming a 2 µm circle of confusion). In folded Tele cameras, typical f-numbers are in the range f/1.5 to f/5.

Slight misalignment in the position of the lens may cause significant defocus to the object intended to be in focus.

There is therefore a need for, and it would be beneficial to expand the capabilities of folded Tele cameras to control (i) the amount of light reaching the Tele sensor and (ii) the DOF of the Tele image by adapting the camera's f-number.

SUMMARY

Embodiments disclosed herein teach folded Tele cameras with adaptive apertures that (i) adapt the Tele aperture according to scene conditions, and (ii) still support the condition of low folded camera module height (no additional height penalty for the camera module due to the adaptive aperture). Such systems comprise a dedicated, adaptive, controllable aperture (henceforth, "adaptive Tele aperture" or simply "adaptive aperture" or "AA") that can be added to the folded Tele camera. Such systems may be used with lenses with cut lens designs or with lenses without cut lens designs.

In various embodiments, an adaptive aperture disclosed herein is formed by a linearly sliding diaphragm using a single pair of linearly sliding blades or a plurality of overlapping linearly sliding blades to provide an aperture of a desired size. The terms "adaptive aperture" and "diaphragm" reflect the same entity.

In various embodiments there are provided systems comprising a folded camera that includes a lens module with a native aperture, the lens module having a height $H_M$, an adaptive aperture located between the native aperture and an optical path folding element, and an adaptive aperture forming mechanism for forming the adaptive aperture, wherein the AA forming mechanism has a height $H_{AA}$ not larger than $H_M$.

In various embodiments, the AA forming mechanism includes an actuator and at least one pair of blades.

In some embodiments, the actuator is operative to move the at least one pair of blades linearly to a given position to form the adaptive aperture.

In some embodiments, the at least one pair of blades includes a plurality of pair of blades, each pair of the plurality operative to be moved to different positions.

In some embodiments, the lens module includes a folded Tele lens with a cut lens design.

In some embodiments, the folded camera is a scanning folded Tele camera. In some embodiments, the scanning folded Tele camera captures a plurality of images of a scene with different fields of view. In some embodiments, the processor is configured to control the adaptive aperture so that the plurality of images have similar depth of field. In some embodiments, the processor is configured to stitch the plurality of images to one or more images having a larger field of view than any single image.

In some embodiments, the adaptive aperture does not limit the native aperture.

In some embodiments, the adaptive aperture is round in a closed position.

In some embodiments, the adaptive aperture is rectangular in a closed position.

In some embodiments, the adaptive aperture is square in a closed position.

In various embodiments, a system further comprises a processor configured for controlling the AA forming mechanism. In some embodiments, the controlling is based on the lightning conditions of a scene. In some embodiments, the processor is configured to control the adaptive aperture so that an image captured with the folded camera has a depth of field similar to a depth of field of an image simultaneously captured with a second camera. In some embodiments, the processor is configured to control the adaptive aperture so that each image captured in a focus stack with the folded camera has a depth of field similar to a depth of field of all other images captured in the focus stack.

In some embodiments, the folded camera is operational to capture objects at object-image distances of less than 50 cm, of less than 25 cm, or of less than 15 cm.

In some embodiments, the folded camera includes a sensor for detecting the lightning conditions. In some embodiments, the lightning conditions are detected with a sensor of a second camera. In some embodiments, the lightning conditions are detected using an illumination estimation.

In some embodiments, the processor is configured to control the AA forming mechanism based on scene depth. The scene depth may be detected with a sensor of the folded camera or with a sensor of a second camera. In some embodiments, the second camera may be a Time-of-Flight camera.

In some embodiments, the processor is configured to calculate the scene depth from stereo camera data provided by the folded Tele camera and by a second camera, from stereo camera data provided by a second camera and by a third camera, by depth from motion estimation, wherein the depth from motion estimation uses image data provided by the folded camera or by a second camera, or from a plurality of images captured under different adaptive aperture settings.

In some embodiments, the folded camera is a Tele camera and the processor is configured to calculate the scene depth from phase detection autofocus data of the folded Tele camera or from phase detection autofocus data of a second camera.

In some embodiments, the processor is configured to retrieve the scene depth information from an application programming interface.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein and should not be considered limiting in any way. Like elements in different drawings may be indicated by like numerals. Elements in the drawings are not necessarily drawn to scale. In the drawings:

FIG. 1 shows a schematic view on a known optical lens module of a folded Tele camera with a cut lens design;

FIG. 2A shows in perspective a known folded Tele camera with an optical lens module with a native, non-adaptive aperture;

DETAILED DESCRIPTION

Figure 2B:
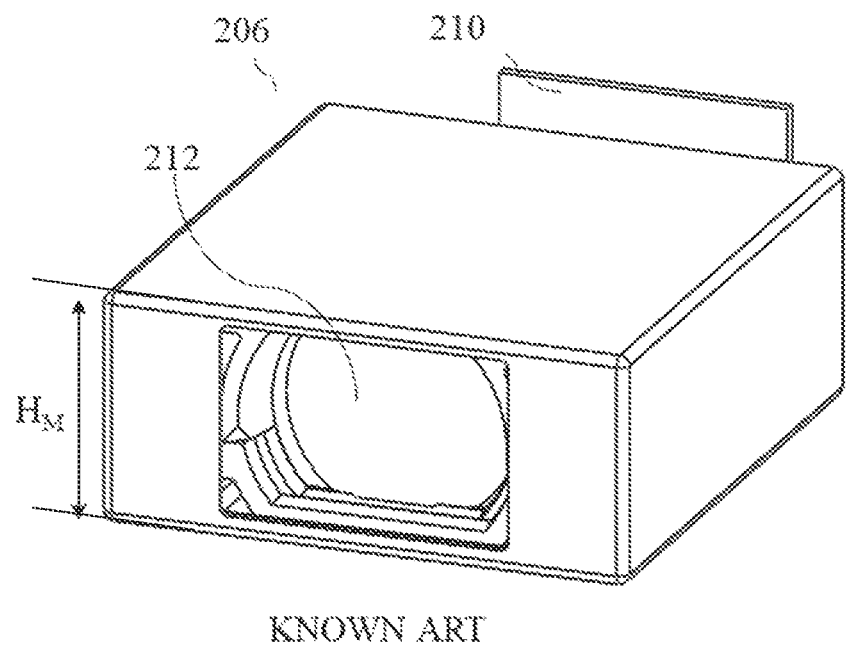
FIG. 2B shows in more detail the optical lens module with the native aperture of the folded camera in FIG. 2A.
Figure 3A:
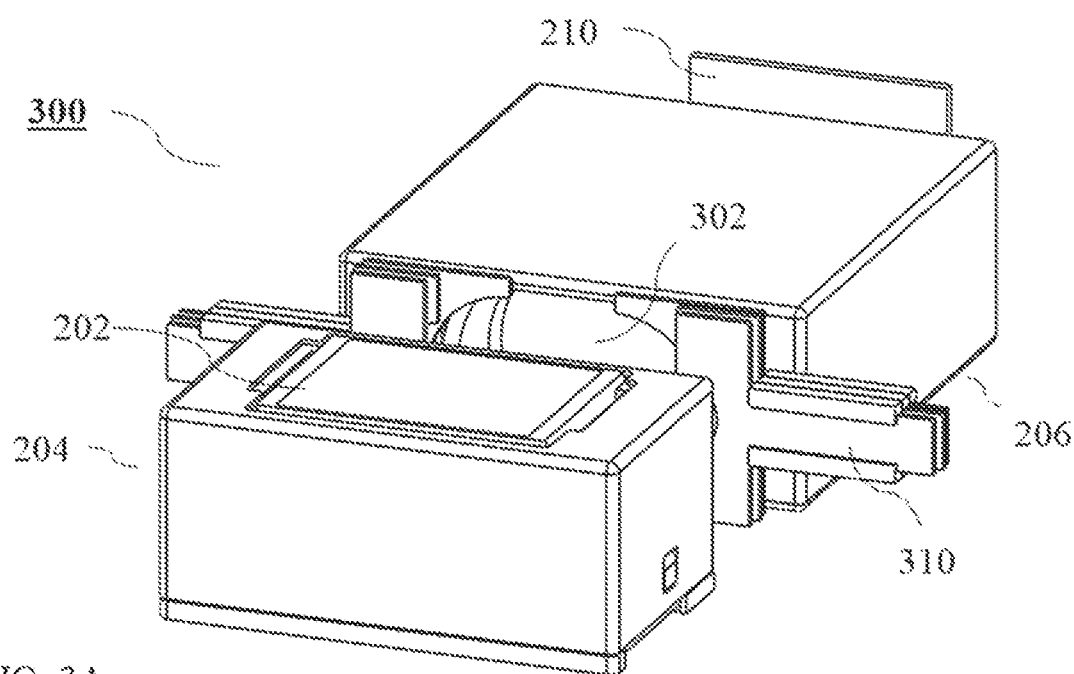
FIG. 3A shows in perspective an embodiment of a folded Tele camera with an optical lens module having an AA disclosed herein.

FIG. 3A shows in perspective an embodiment of a folded Tele camera with an optical lens module having an adaptive aperture (AA) disclosed herein and numbered 300. Camera 300 may include some elements similar to elements in camera 200, for example an OPFE, an optical lens module and an image sensor, which are therefore numbered with same numerals as in FIG. 2A. In contrast with camera 200 and in addition, camera 300 comprises an AA 302 located between OPFE 204 and optical lens module 206 and an adaptive aperture forming mechanism ("AA forming mechanism" or simply "AA mechanism") 310. In some embodiments, AA 302 is positioned close to native aperture 212 (i.e. external and close to a front panel 216 of an optical module housing 214), for example at a distance close enough to prevent stray light from entering the lens module. In some embodiments, the AA may be a part of (integral with) the lens module. In some embodiments, the AA may be attached physically to the lens module.

Adaptive apertures and AA mechanisms like 310 are characterized in that: a) when fully open, the AA does not limit the native aperture, and b) AA mechanism 310 does not increase a total folded Tele camera module height $H_M$ (shown in the Y direction).

Figure 3B:
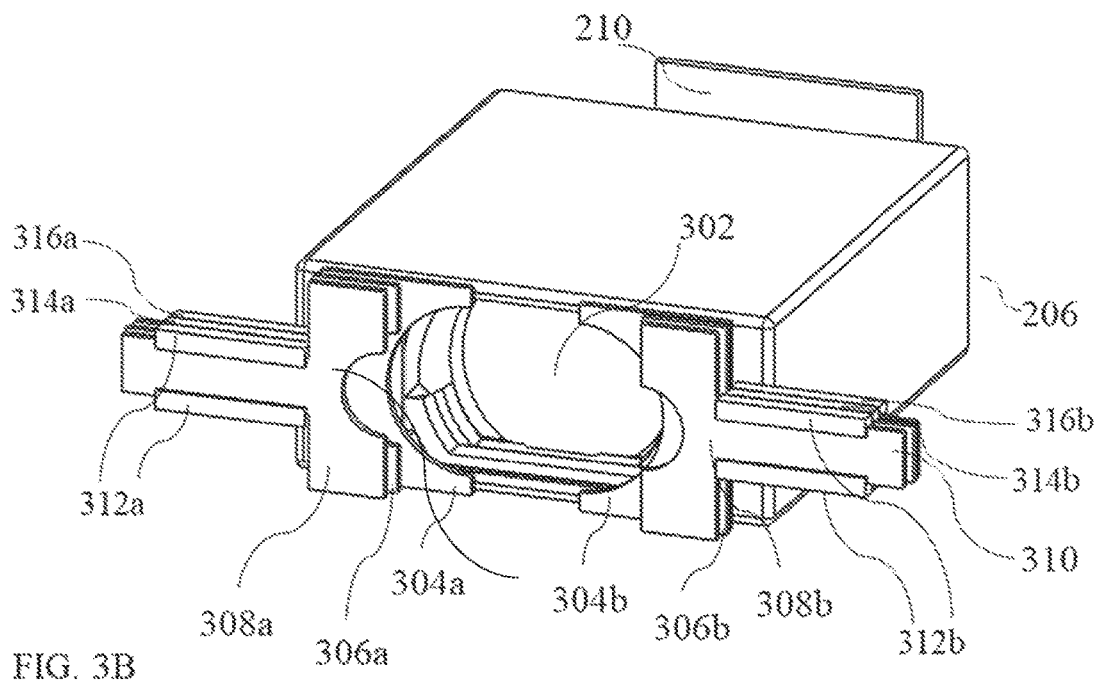
FIG. 3B shows the optical lens module and the AA of FIG. 3A, with the AA in an open state.
Figure 3C:
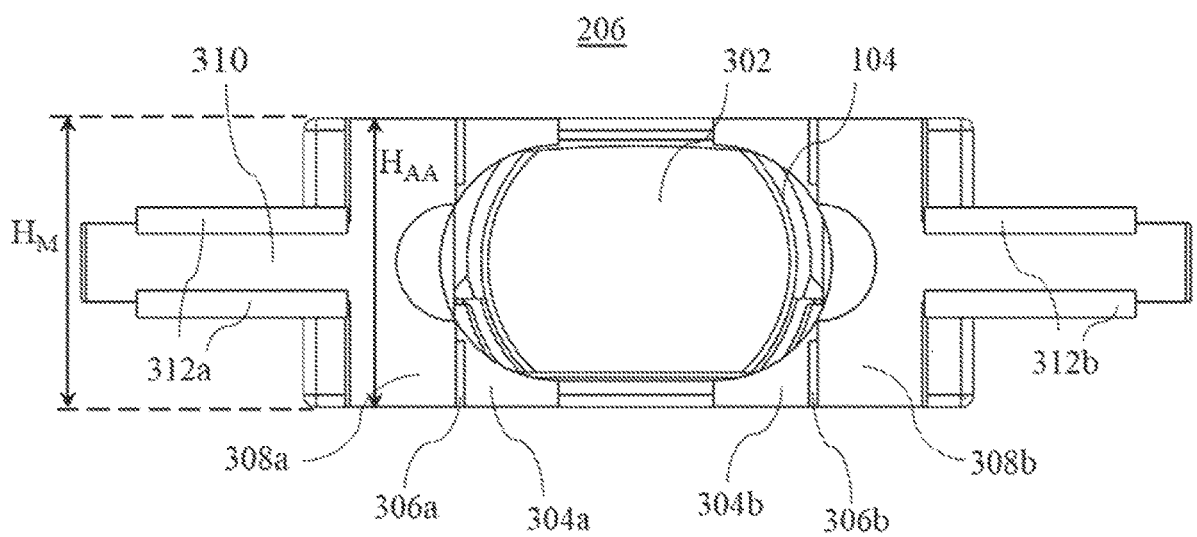
FIG. 3C shows the optical lens module and the AA of FIG. 3B in front view.

FIG. 3B shows a perspective view of AA 302 and optical lens module 206 in an open state or position, where AA 302 corresponds to native aperture 212. FIG. 3C shows the same in a front view. AA mechanism 310 comprises six blades 304a, 304b, 306a, 306b, 308a and 308b, divided into left hand blades (304a, 306a and 308a) and right hand (304b, 306b and 308b) blades, and one or more actuators (se e.g. 714 in FIG. 7) and position sensors (not shown). The blades can slide inside respective sliding rails, (recesses) e.g. in a linear movement. Thus, blade 308a can slide in rails 312a and blade 308b can slide in rails 312b, blade 306a can slide in rails 314a and blade 306b can slide in rails 314b, blade 304a can slide in rails 316a and blade 304b can slide in rails 316b. The blades may be part of an actuator (not shown here). A pair of blades can be referred to by a single number. That is, blades 304a and 304b can be referred to as "blades 304", blades 306a and 306b can be referred to as "blades 306" and blades 308a and 308b can be referred to as "blades 308". A height of AA mechanism 310 $H_{AA}$ does not exceed a total folded Tele camera module height $H_M$.

Mechanism 310 supports opening the AA to a size that is larger than the size of native lens aperture 212, so that, when it is open widely, AA mechanism 310 does not block light that would have otherwise (had the AA mechanism not been included in the Tele camera) reached native lens aperture 212. This property allows to set the adaptive aperture 302 to a large size in order to fully utilize the native Tele lens aperture size, in case it is important to collect as much light as possible, or in case a very shallow DOF is desired. Blades 304, 306, 308 have each an open state and a closed state. Blades 304 have to be closed in order to effectively close blades 306, and blades 306 have to be closed in order to effectively close blades 308, i.e. the overlapping of the blades underlies the functionality of AA mechanism 310.

Figure 3D:
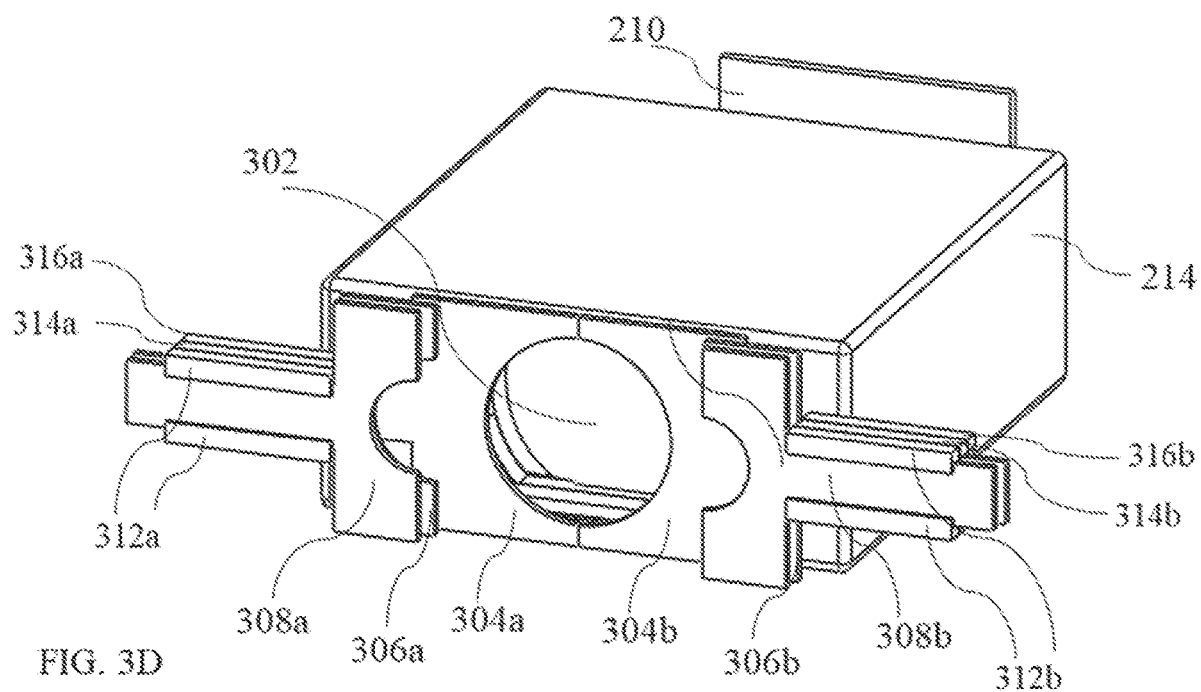
FIG. 3D shows in perspective the optical lens module and the AA of FIG. 3A, with the AA in a first closed state.
Figure 3E:
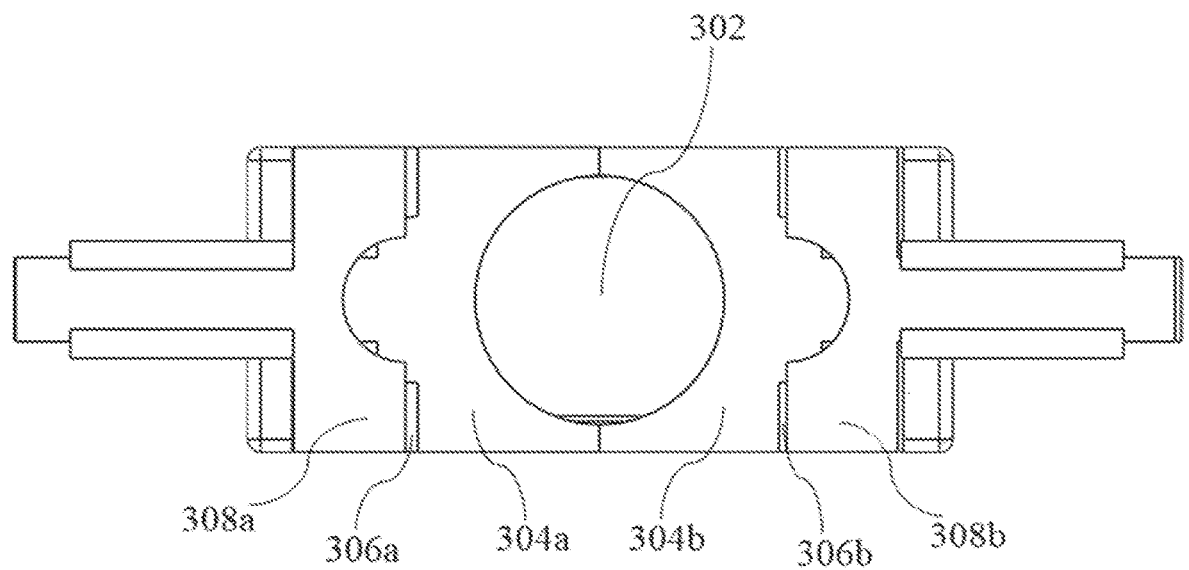
FIG. 3E shows the optical lens module and the AA of FIG. 3D in front view.

FIG. 3D shows a more detailed perspective view of adaptive aperture 302 and optical lens module 206 of camera 300 in a first closed state, different from the one in FIGS. 3A and 3B. FIG. 3E shows the same in a front view. In these figures, blades 304a and 304b are closed while other blades, such as blades 306 and 308 are open. The folded Tele lens has an adaptive Tele aperture 302 that is rotationally symmetric. The folded Tele lens with adaptive aperture 302 and with blades 304 closed is smaller than the native Tele lens aperture 212, corresponding to a lower amount of light reaching the sensor and a deeper DOF than in the case of native Tele lens aperture 212. In an example, a stroke of the linear movement of each of the blades 304a and 304b for forming a first closed state may be in the range of 0.1 mm to 2 mm.

Figure 3F:
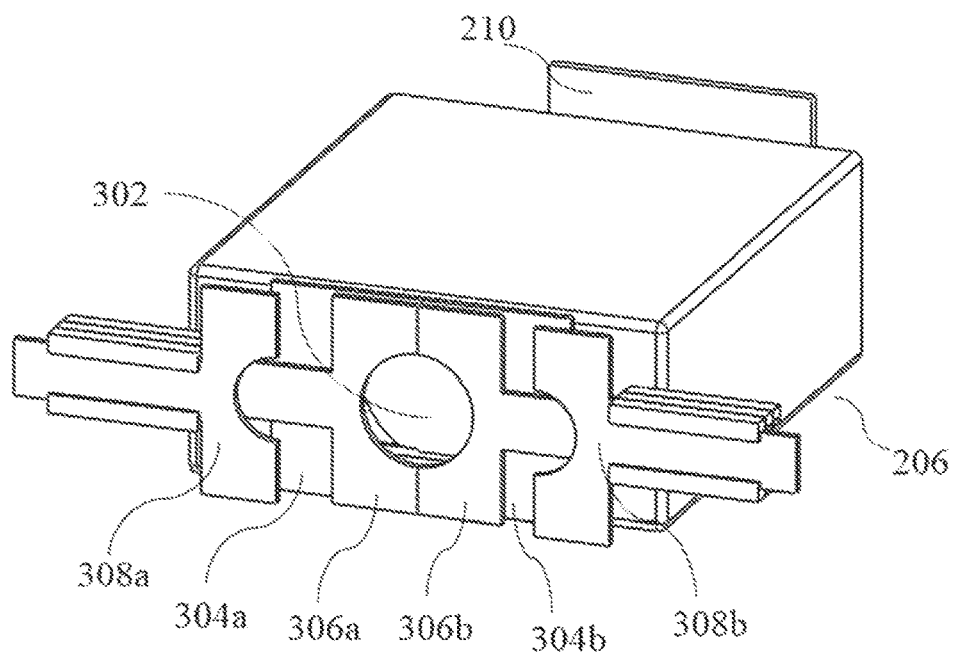
FIG. 3F shows in perspective the optical lens module and the AA of FIG. 3A, with the AA in a second closed state.
Figure 3G:
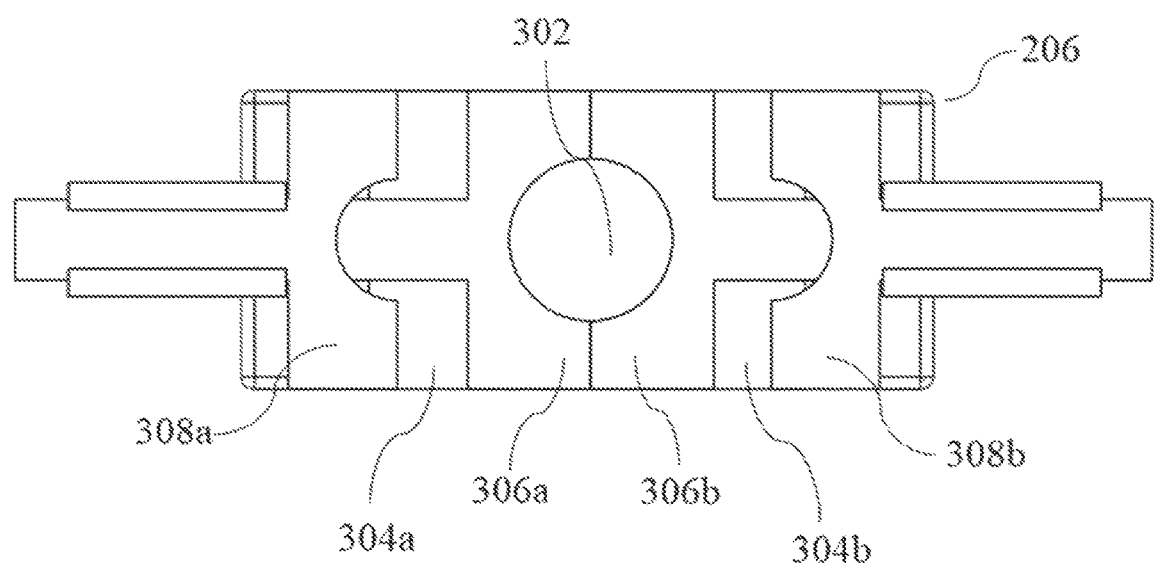
FIG. 3G shows the optical lens module and the AA of FIG. 3F in front view.

FIG. 3F shows optical lens module 206 in a second closed state, with blades 306a and 306b (as well as 304a and 304b) closed. FIG. 3G shows the same in a front view. Here, the size of AA 302 is smaller than in the case of FIG. 3D, and AA is rotationally symmetric. In an example, a stroke of the linear movement of each of the blades 306a and 306b for forming a second closed state may be in the range of 0.3 mm to 2.5 mm.

Figure 3H:
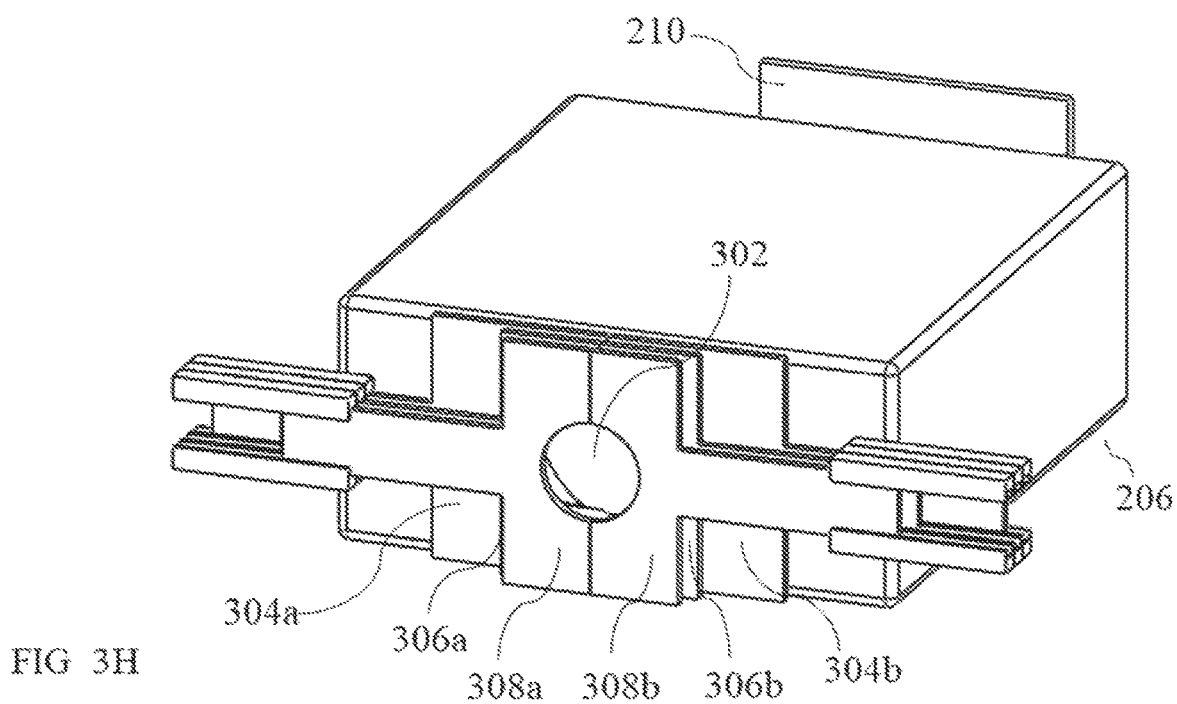
FIG. 3H shows in perspective the optical lens module and the AA of FIG. 3A, with the AA in a third closed state.
Figure 3I:
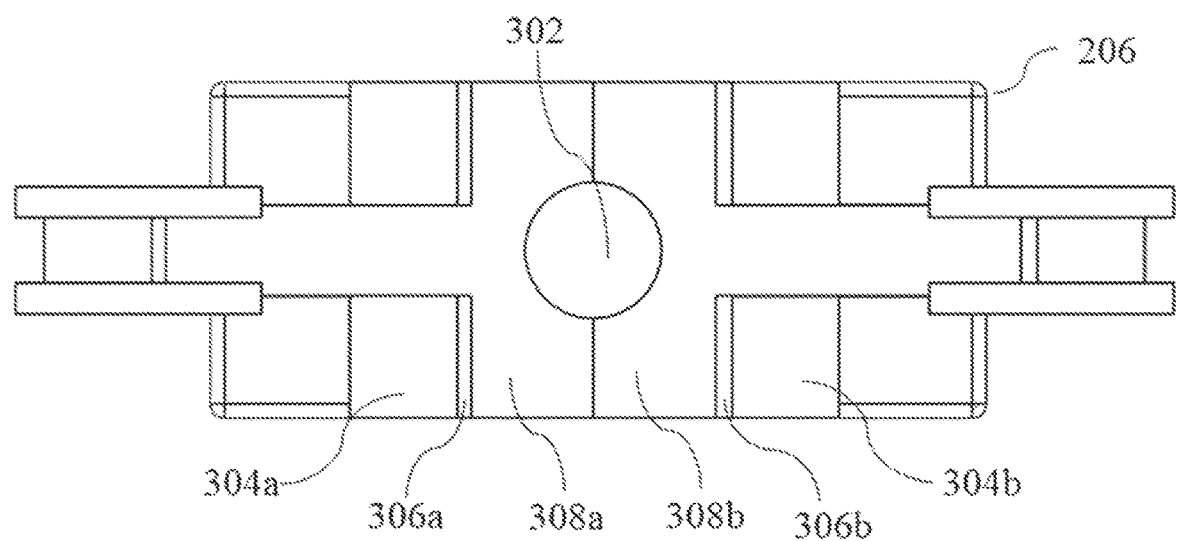
FIG. 3I shows the optical lens module and the AA of FIG. 3H in front view.

FIG. 3H shows optical lens module 206 in a third closed state with blades 308a and 308b (as well as 304a, 304b, 306a and 306b) closed. FIG. 3I shows the same in a front view. Here, the size of AA is even smaller than in the case of FIG. 3F, and AA is rotationally symmetric. The case shown in FIGS. 3H and 3I (with three blades of varying size), provides the lowest amount of light and the deepest DOF that can be adapted by this design. In an example, a stroke of the linear movement of each of the blades 308a and 308b for forming a third closed state may be in the range of 0.5 mm to 4 mm.

Figure 3J:
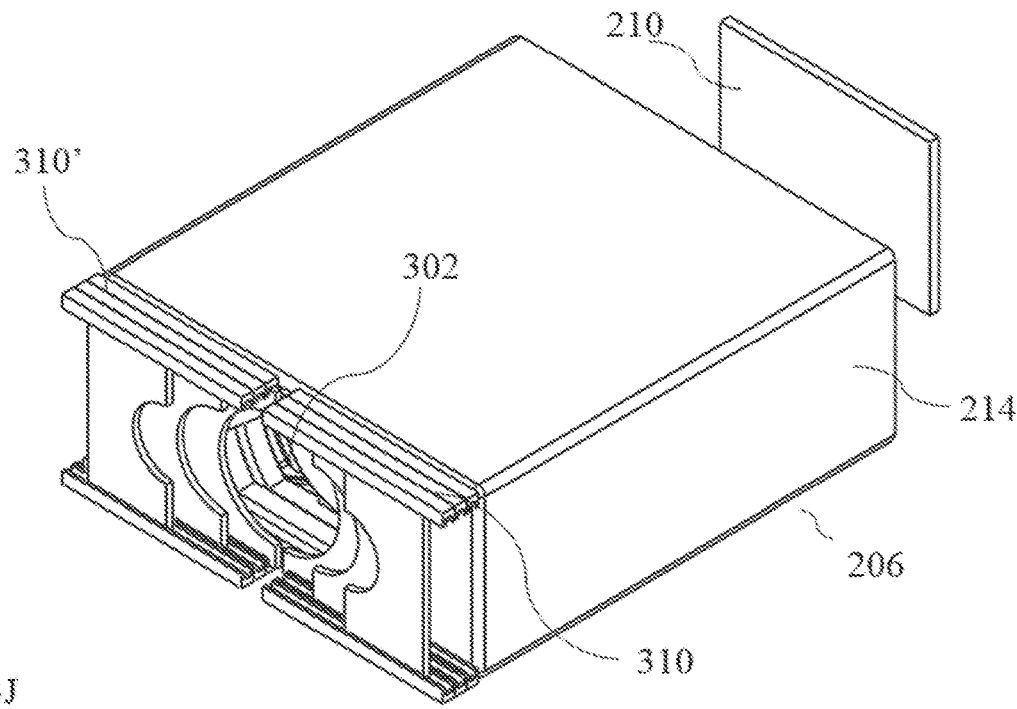
FIG. 3J shows another embodiment of a folded Tele camera with an optical lens module having an AA disclosed herein.
Figure 3K:
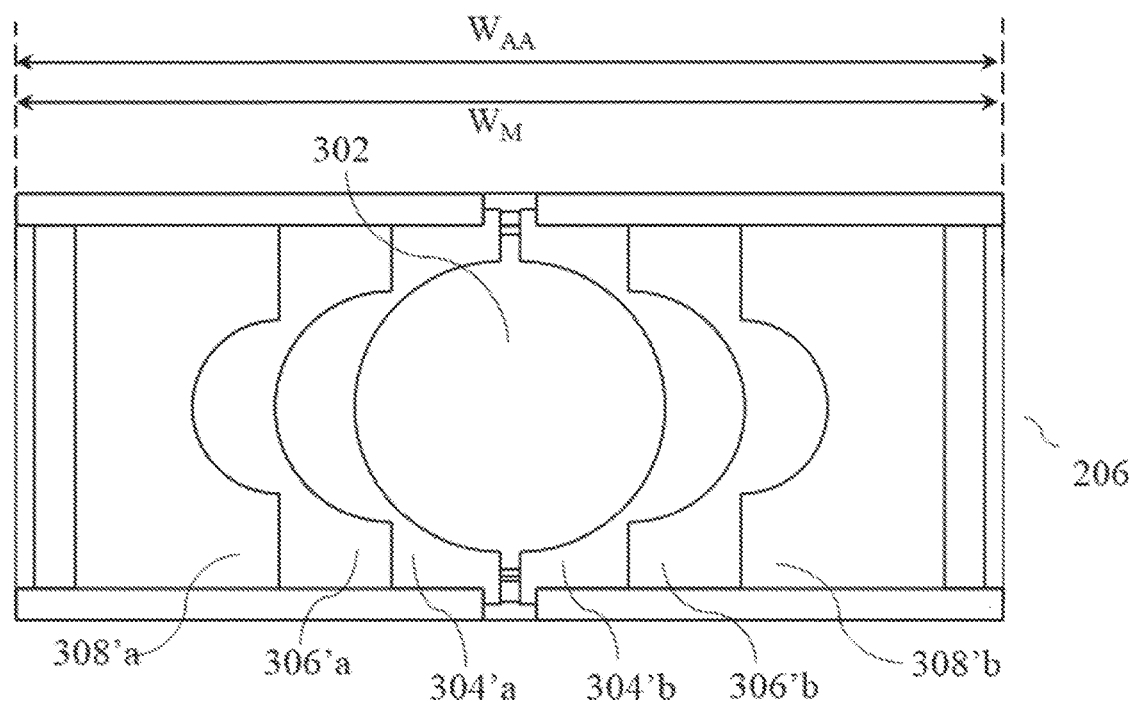
FIG. 3K shows the optical lens module and the AA of FIG. 3J in front view.

FIG. 3J shows in perspective view another embodiment of an optical lens module 206 with an AA mechanism 310'. FIG. 3K shows the same in a front view. AA mechanism 310' comprises six blades 304'a, 304'b, 306'a, 306'b, 308'a and 308'b, divided into left hand blades (304'a, 306'a and 308'a) and right hand (304'b, 306'b and 308'b) blades, and one or more actuators (se e.g. 714 in FIG. 7) and position sensors (not shown). The functionality is identical to what is shown in FIG. 3B to FIG. 3I. For the sake of illustration, the blades are in an intermediate state, which is not desired for photography. Here AA mechanism 310 supports the formation of the adaptive aperture such that: 1) when fully open, the adaptive aperture does not limit the native aperture, 2) the adaptive aperture does not increase a total folded Tele camera module height $H_M$, and 3) a width of AA mechanism 310 $W_{AA}$ does not increase a total folded Tele camera module width $W_M$, i.e. $W_{AA} \leq W_M$.

The design shown in FIGS. 3A-3H allows for four different, discrete adaptive aperture sizes formed by overlapping blades.

Figure 4A:
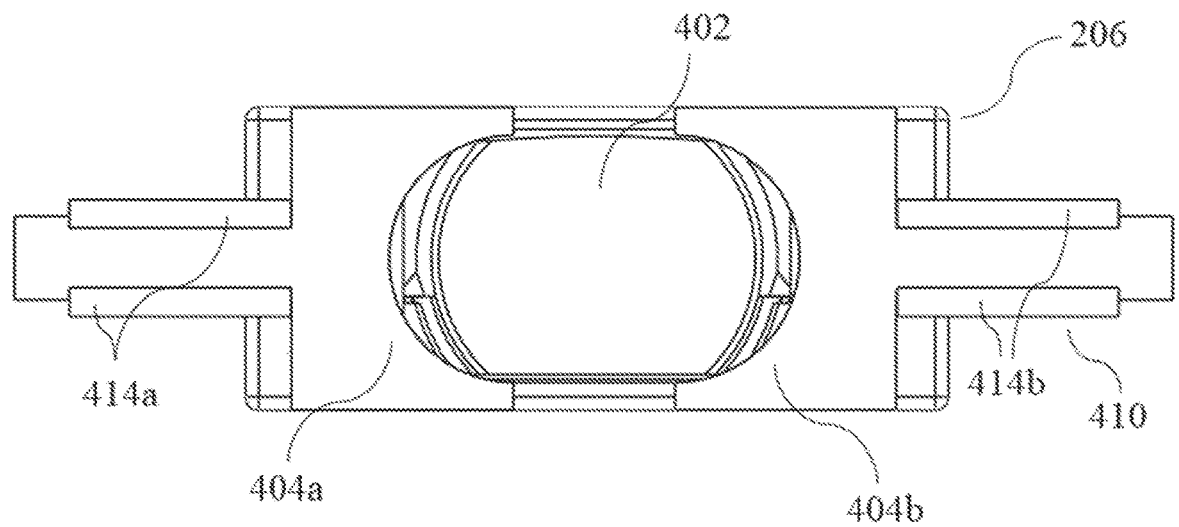
FIG. 4A shows another embodiment of an adaptive aperture disclosed herein in front view in an open state.
Figure 4B:
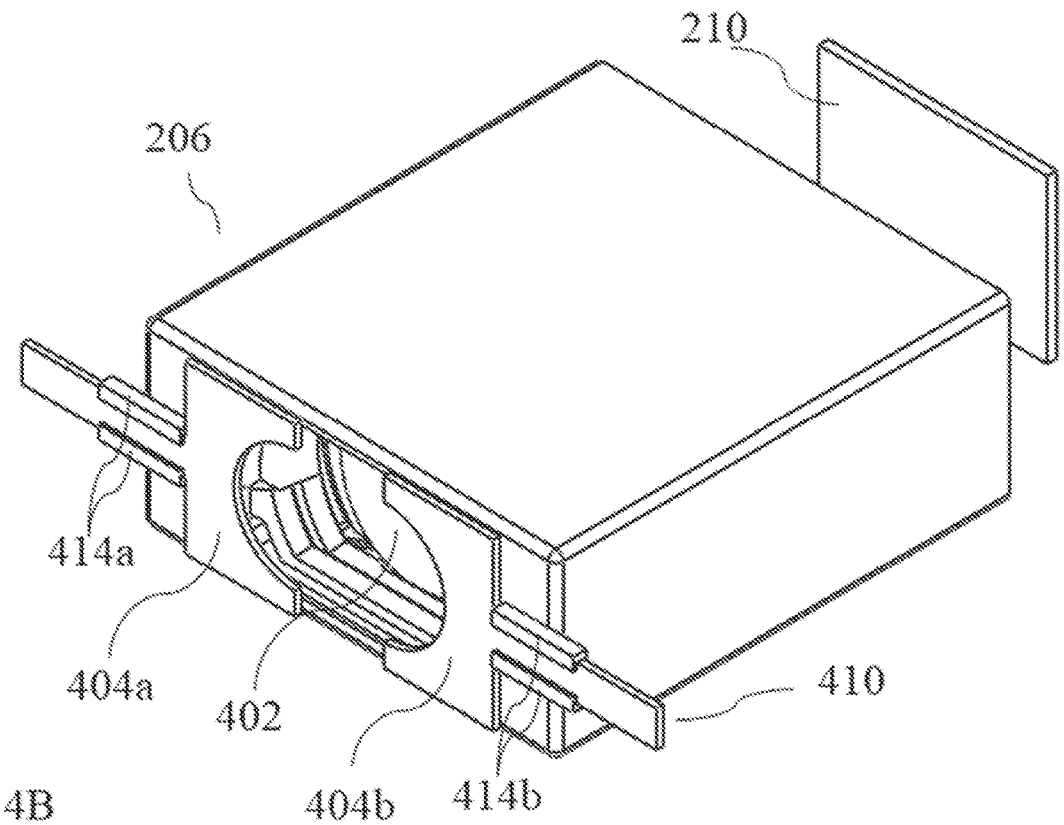
FIG. 4B shows the embodiment of FIG. 4A in a perspective view.
Figure 4C:
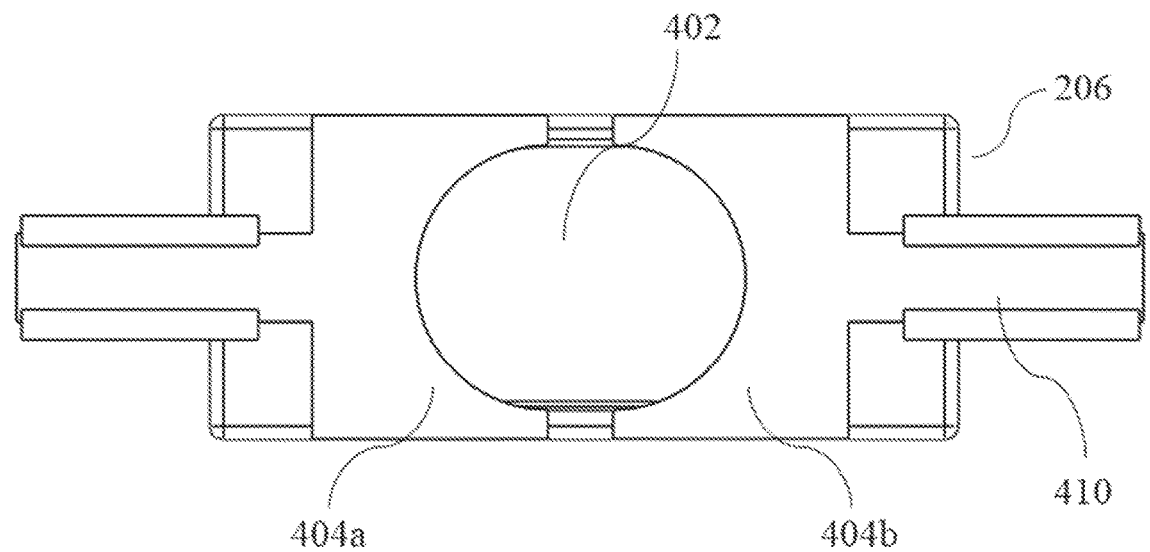
FIG. 4C shows the AA of FIG. 4A in first closed state.

FIG. 4A shows in front view of another embodiment of an adaptive aperture numbered 402 together with optical lens module 206 in an open state. FIG. 4B shows the embodiment of FIG. 4A in a perspective view, showing also image sensor 210. "Open state" means here that the adaptive aperture 402 has the same size as the native aperture 212. An adaptive aperture forming mechanism 410 comprises only one blade pair 404a and 404b designed to form a semi-elliptic shape that corresponds to the non-symmetrical width and height of the native Tele lens aperture, as well an actuator (see FIG. 7). Blades 404a and 404b move linearly inside, respectively, rails 414a and 414b. In this embodiment, the rails are external to front panel 216 of optical module housing 214. FIG. 4C shows the embodiment of FIG. 4A and FIG. 4B with blades 404a and 404b partly closed in a first closed position. In this embodiment, the adaptive Tele aperture is non-rotationally symmetric. The semi-elliptic shape of the resulting aperture is retained when the adaptive aperture is in a different "closed" position but not fully closed as in FIG. 4D, as long as the adaptive Tele aperture width is larger than the native Tele lens aperture height.

Figure 4D:
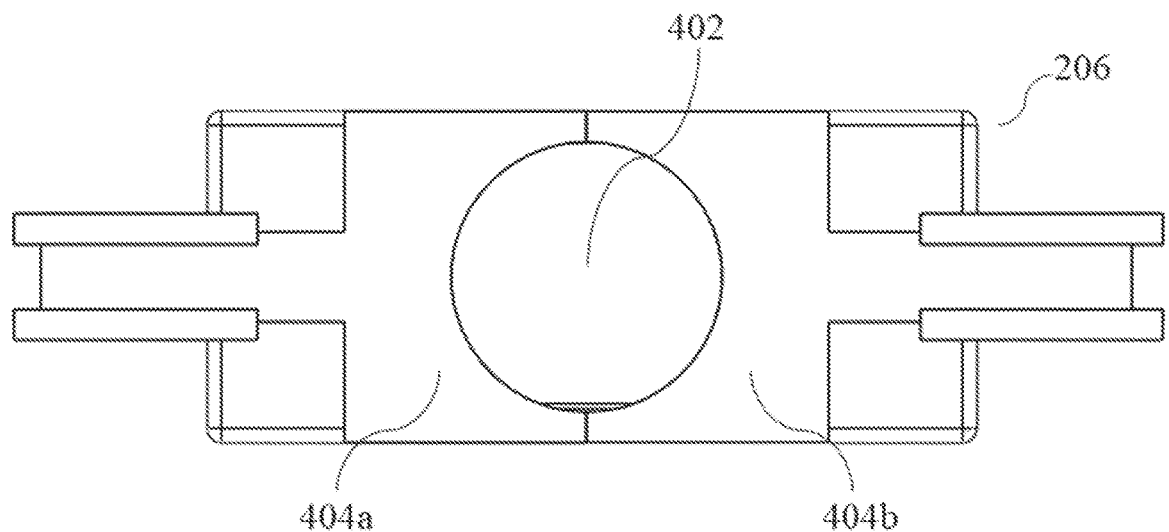
FIG. 4D shows the AA of FIG. 4A in second closed state.

FIG. 4D shows the embodiment of FIG. 4A and FIG. 4B with blades 404a and 404b in a second closed position more closed that the first closed position. The blades close in a way that forms a rotationally symmetric, round aperture shape.

Figure 4E:
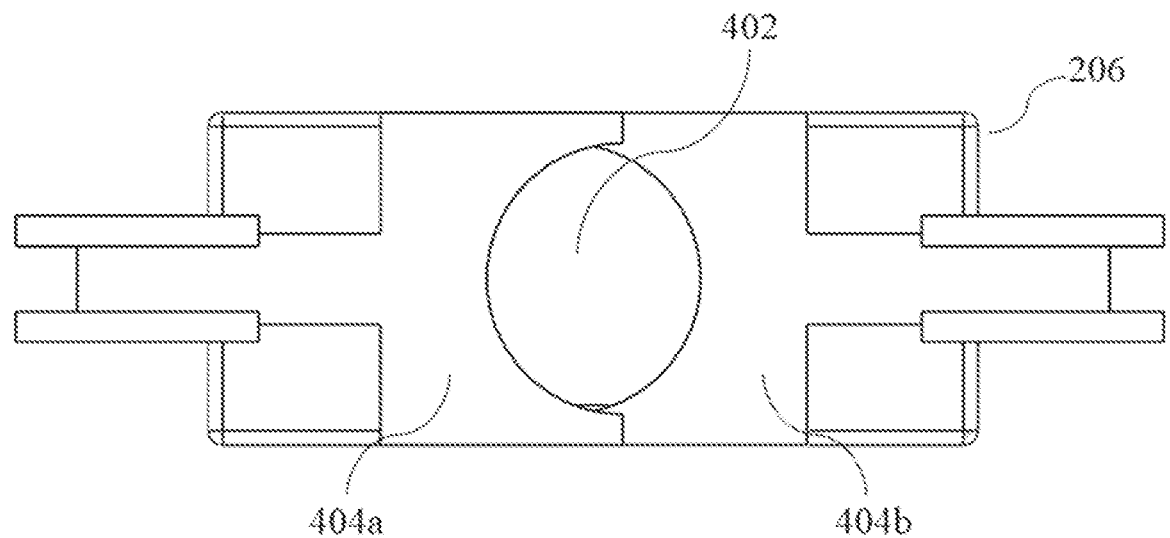
FIG. 4E shows the AA of FIG. 4A in third closed state.

FIG. 4E shows the embodiment of FIG. 4A and FIG. 4B with blades 404a and 404b in a third closed position more closed that the second closed position. In this embodiment, a folded Tele camera with a faceted folded Tele lens has an adaptive Tele aperture that is non-rotationally symmetric.

The design shown in FIGS. 4A-4E allows for continuously controlling the adaptive aperture size by linear actuation of the blades. In an example, a stroke of the linear actuation of each of the blades 404a and 404b to form adaptive apertures as shown here may be more than 0.1 mm and less than 4 mm.

Figure 5A:
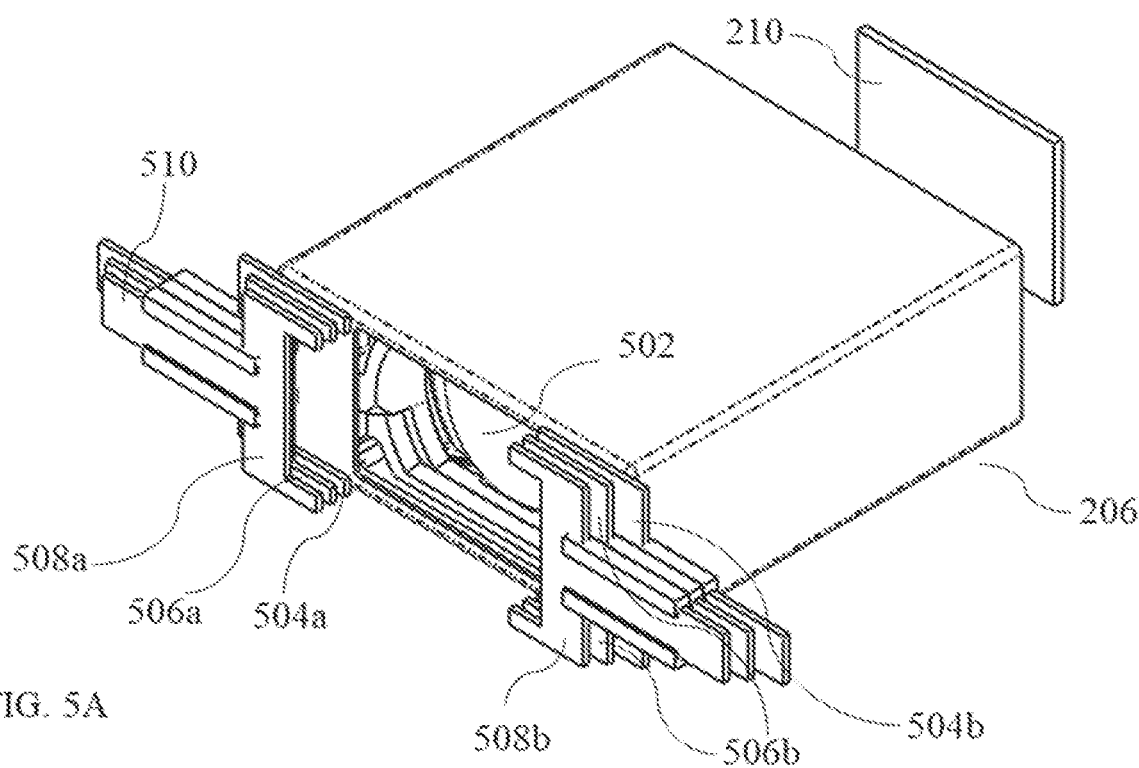
FIG. 5A shows in perspective yet another embodiment of an embodiment of a folded Tele camera with an optical lens module having an adaptive aperture disclosed herein, with the AA in an open state.

FIG. 5A shows a perspective view of yet another embodiment numbered of an optical lens module with cut lens design with an adaptive aperture 502 in open state or position. Image sensor 210 is also shown. Here, an AA forming mechanism 510 comprises (like AA 302) six blades 504a,b, 506 a,b and 508a,b, divided into left (a) and right (b) blades and one or more actuators (se e.g. 714 in FIG. 7) and position sensors (not shown).

Figure 5B:
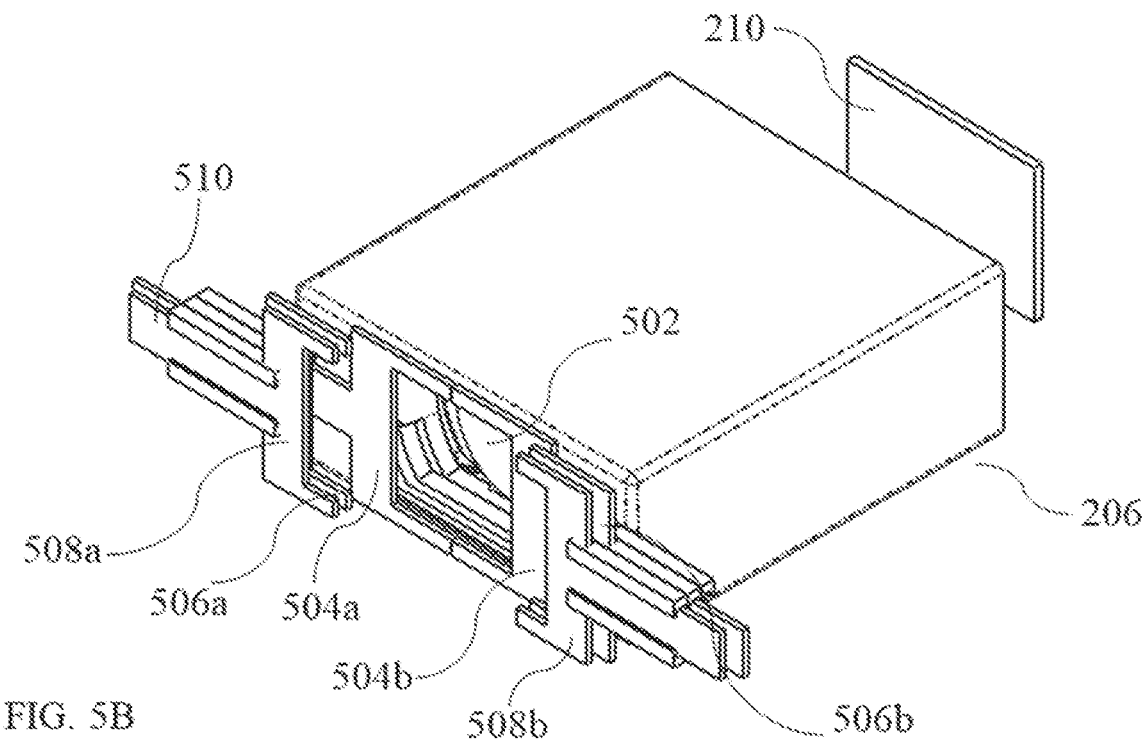
FIG. 5B shows in perspective the optical lens module and the AA of FIG. 5A, with the AA in a first closed state.

FIG. 5B shows the embodiment of FIG. 5A in a first closed state, with blades 504a and 504b closed. In this embodiment, adaptive Tele aperture 502 is rectangular. The folded Tele lens has a smaller aperture than native Tele lens aperture 212, corresponding to a lower amount of light reaching the sensor and a deeper DOF than in case of native Tele lens aperture 212. In an example, a stroke of the linear movement of the blades 504a and 504b for forming a first closed state may be in the range of 0.1 mm to 2 mm.

Figure 5C:
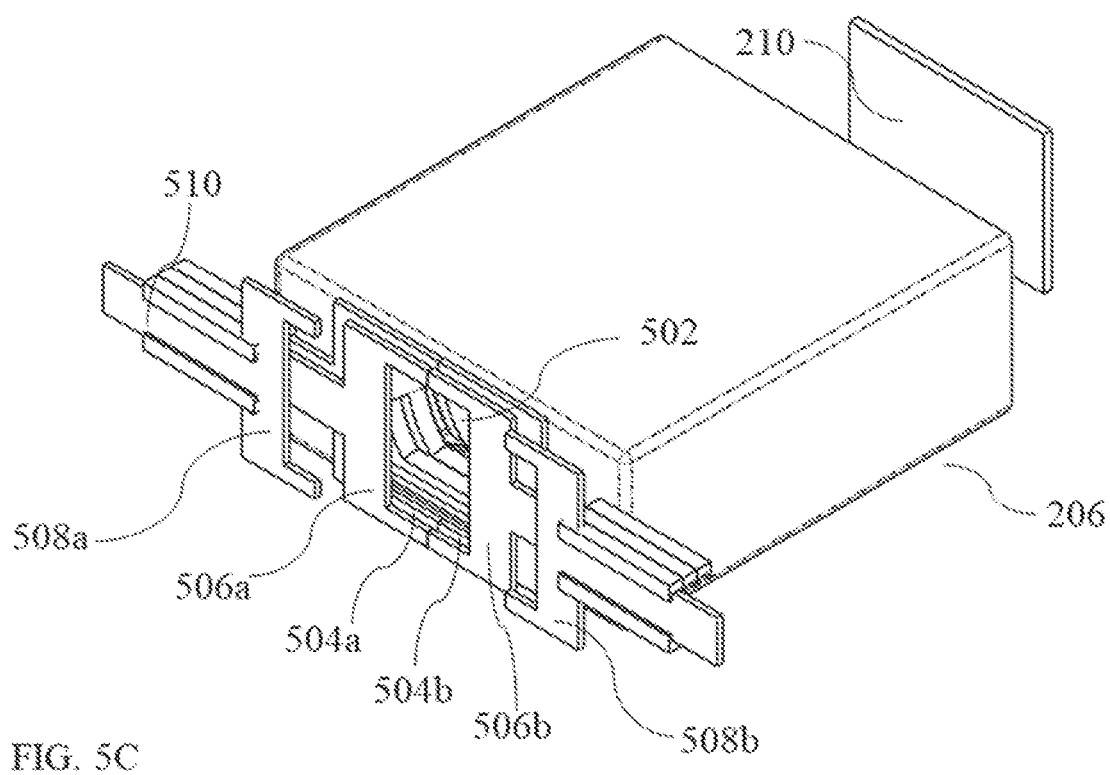
FIG. 5C shows in perspective the optical lens module and the AA of FIG. 5A, with the AA in a second closed state.

FIG. 5C shows adaptive aperture 502 with blades 506a and 506b in a second closed state, closed. In this case, the folded Tele lens has a smaller aperture than in the case of FIG. 5B.

Figure 5D:
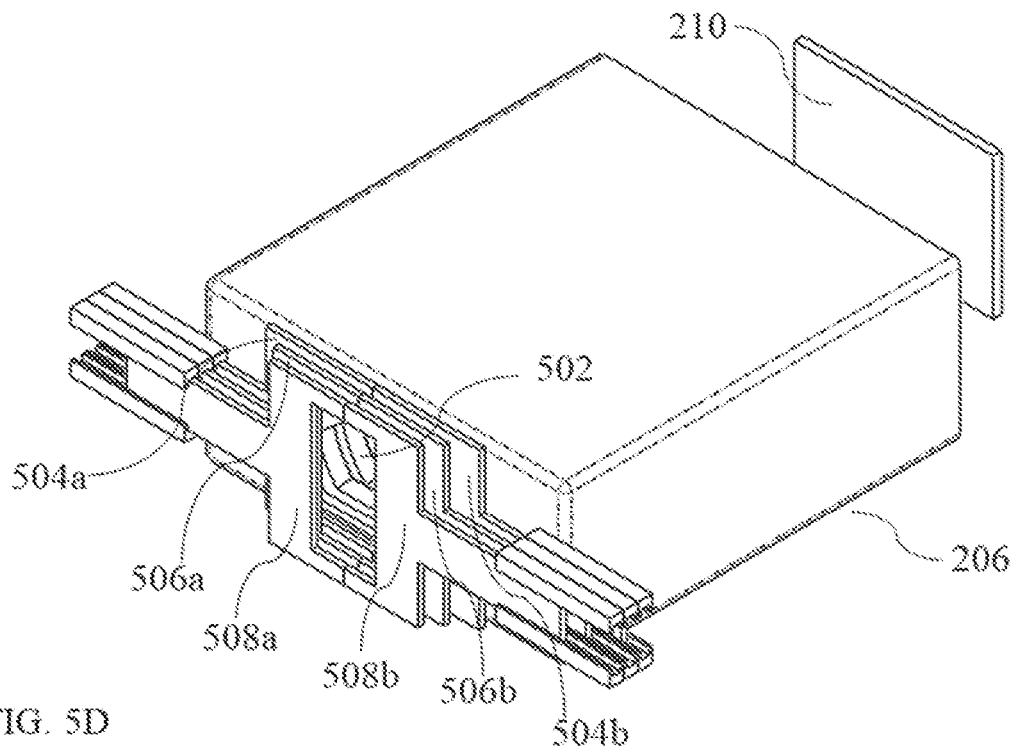
FIG. 5D shows in perspective the optical lens module and the AA of FIG. 5A, with the AA in a third closed state.

FIG. 5D shows the embodiment of FIG. 5A with blades in a third closed state, 508a and 508b closed. As above, aperture 502 is rectangular and the adaptive aperture is smaller than in the case of FIG. 5C. For the embodiment shown here (with three blades of varying size), this is the lowest amount of light and the deepest depth of field that can be adapted. In an example, a stroke of the linear movement of the blades 508a and 508b for forming a third closed state may be in the range of 0.5 mm to 4 mm.

In another embodiment, the rectangular shape may form a square aperture (not shown), i.e. an aperture with identical height and width.

The design shown in FIG. 5A-FIG. 5D allows for four different, discrete adaptive aperture sizes formed by overlapping blades.

Figure 6A:
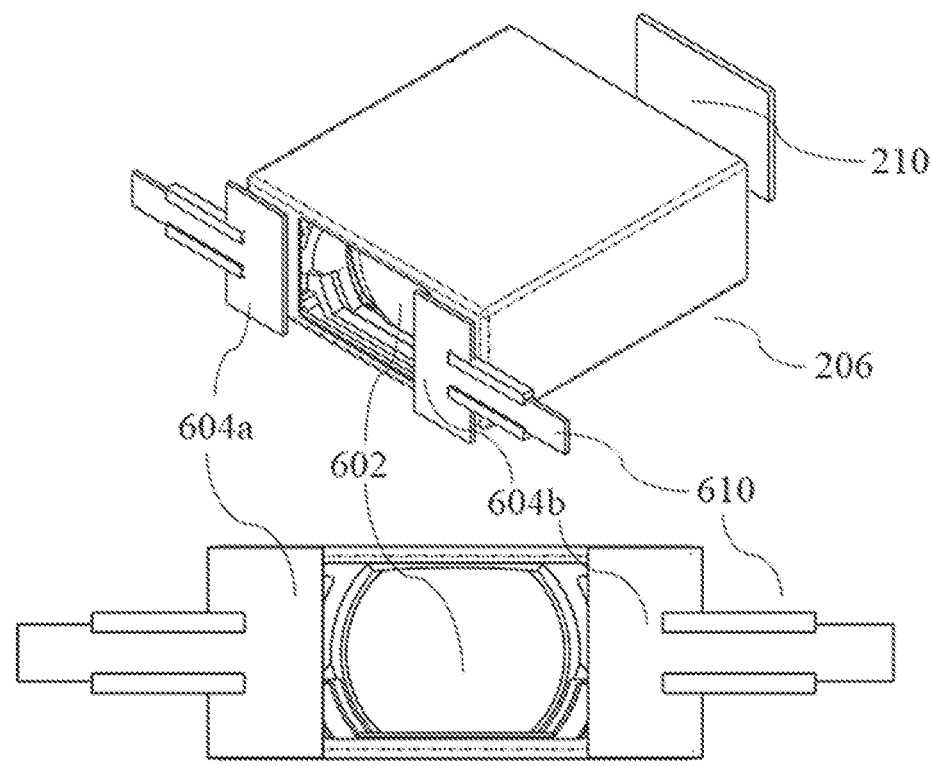
FIG. 6A shows a perspective view and a front view of yet another embodiment of an optical lens module with an adaptive aperture disclosed herein, with the AA in an open state.

FIG. 6A shows a perspective view and a front view of yet another embodiment of an optical lens module 206 with cut lens design with an adaptive aperture 602. Image sensor 210 is also shown. An AA forming mechanism 610 comprises only one pair of blades 604a and 604b, which in FIG. 6A are in open position. An actuator (not shown) can move the blade pair 604a and 604b in a continuous manner, so that the AA mechanism supports opening and closing the adaptive Tele aperture with the properties that: 1) when fully open, adaptive Tele aperture 602 corresponds to native Tele lens aperture 212, and 2) AA mechanism 610 does not increase the total folded Tele camera module height.

Figure 6B:
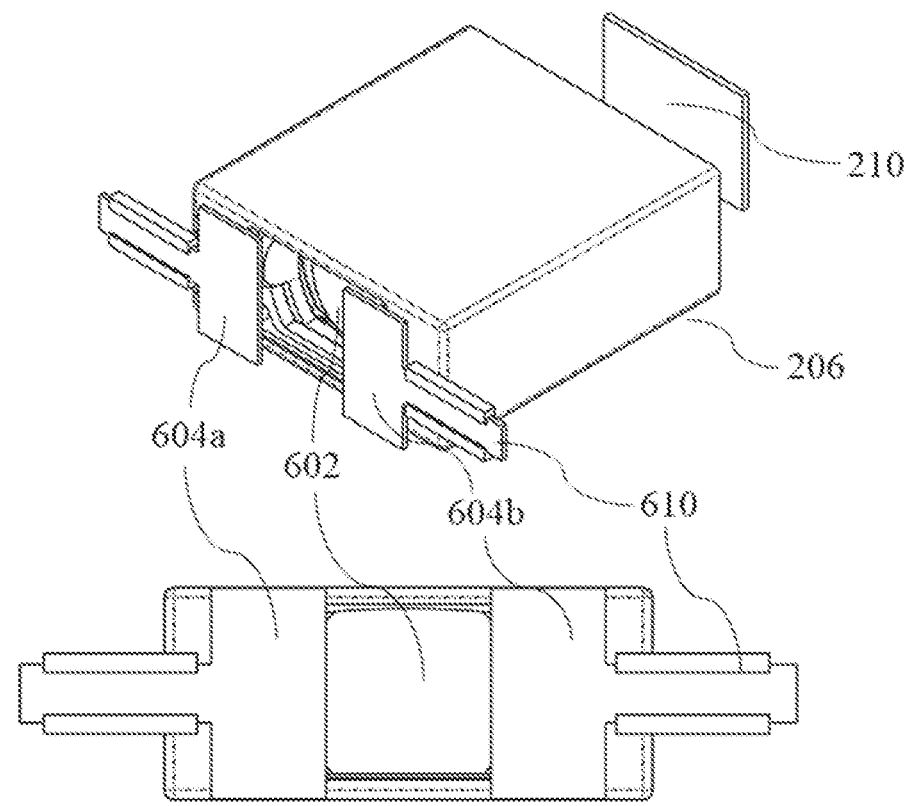
FIG. 6B shows the optical lens module with an adaptive aperture of FIG. 6A with the AA in a first closed state.
Figure 6C:
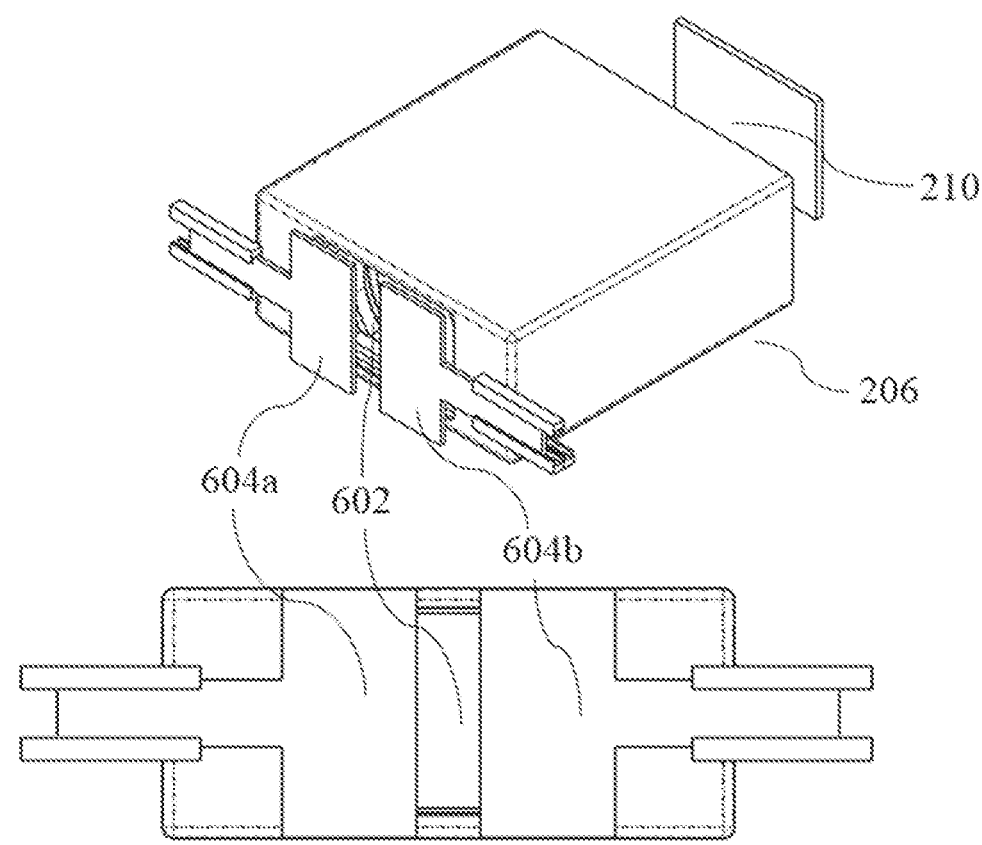
FIG. 6C shows the optical lens module with an adaptive aperture of FIG. 6A in a second closed state.

FIG. 6B shows the embodiment of FIG. 6A with blades 604a and 604b in a first closed position more closed than in FIG. 6A. In this embodiment, the adaptive Tele aperture has a rectangular shape. FIG. 6C shows the embodiment of FIG. 6A with blades 604a and 604b in a second closed position more closed that the first closed position. The design shown in FIG. 6A-FIG. 6C allows for continuously controlling the AA size. In an example, a stroke of the linear actuation of blades 604a and 604b to form AAs as shown here may be less than 4 mm.

Figure 6D:
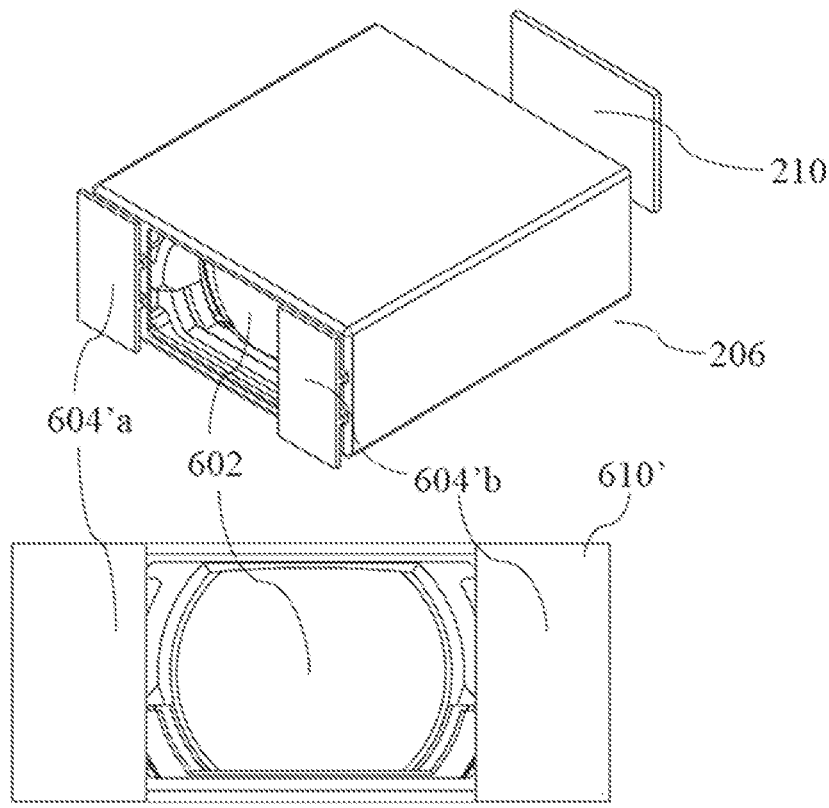
FIG. 6D shows a perspective view and a front view of yet another embodiment of an optical lens module with an adaptive aperture disclosed herein, with the AA in an open state.
Figure 6E:
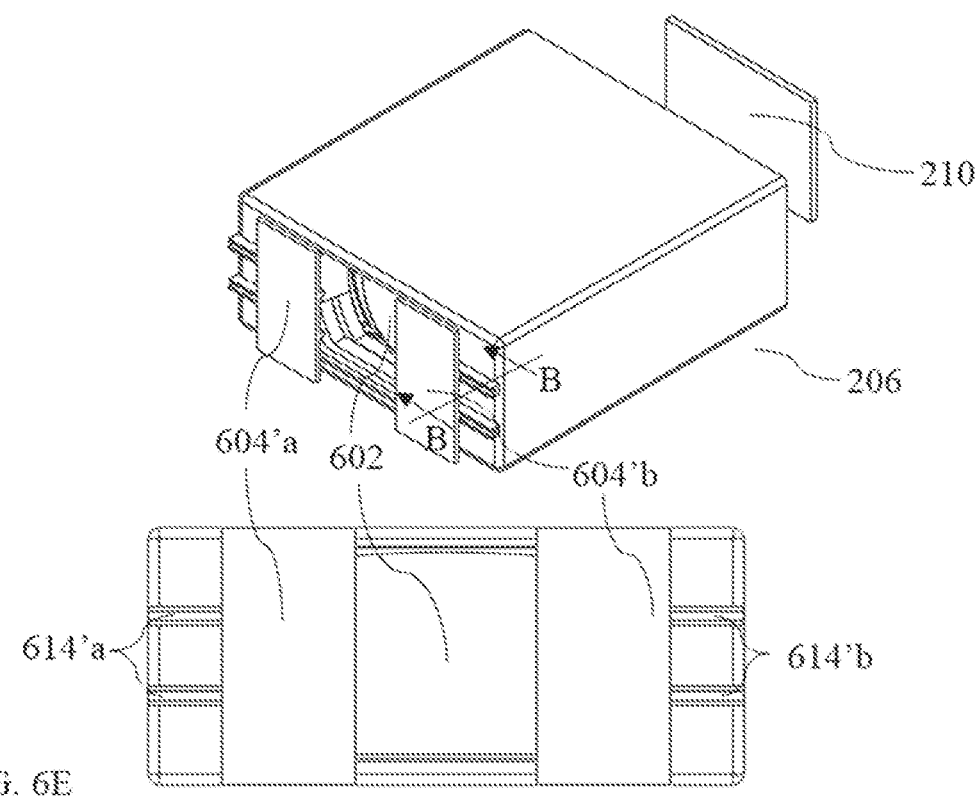
FIG. 6E shows the optical lens module with an adaptive aperture of FIG. 6D, with the AA in a first closed state.
Figure 6F:
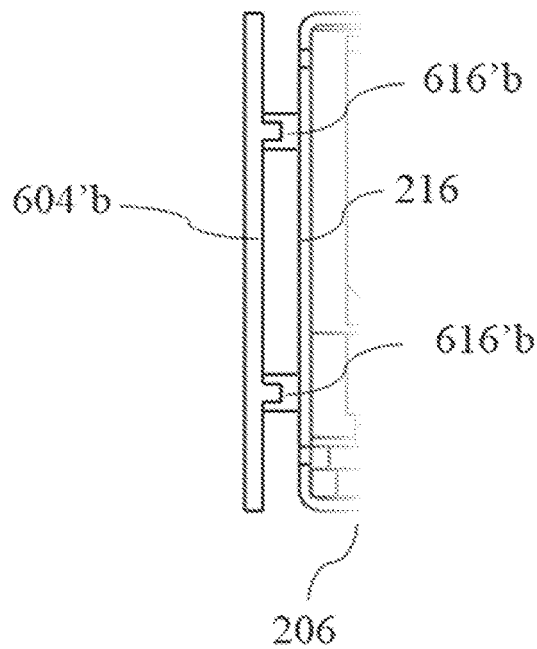
FIG. 6F shows a cross-sectional view on the embodiment shown in FIG. 6D and FIG. 6E.

FIG. 6D shows a perspective view and a front view of yet another embodiment of an optical lens module with cut lens design with an adaptive aperture 602. Image sensor 210 is also shown. An AA forming mechanism 610' comprises one pair of blades 604'a and 604'b, both in open position. FIG. 6E shows the embodiment of FIG. 6D with blades 604's and 604'b in a first closed position. FIG. 6F shows a cross-sectional view on the embodiment shown in FIG. 6D and FIG. 6E. An actuator (not shown) can move blade pair 604'a and 604'b linearly and in a continuous manner inside rails 614'a and 614'b. AA mechanism 610' supports opening and closing of the AA with the properties that: 1) when fully open, adaptive Tele aperture 602 corresponds to the native Tele lens aperture 212; 2) AA mechanism 610' does not increase the total folded Tele camera module height, H; and 3) a width $W_{AA}$ of AA mechanism 310 does not increase a total folded Tele camera module width $W_M$, i.e. $W_{AA} \leq W_M$.

Figure 7:
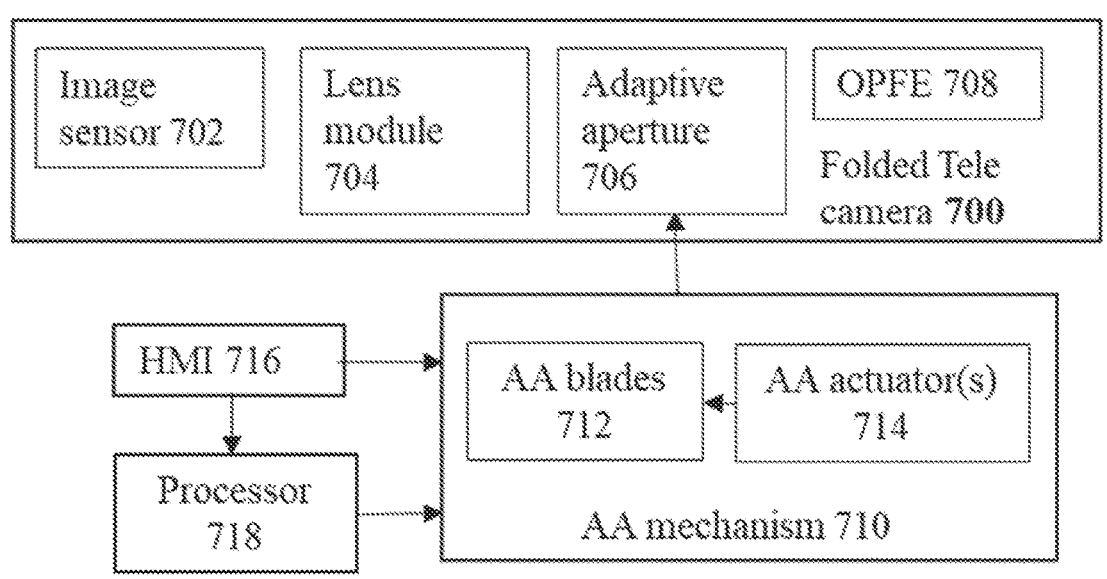
FIG. 7 shows schematically in a block diagram an embodiment of a system disclosed herein.

FIG. 7 shows schematically in a block diagram an embodiment of a system disclosed herein and numbered 750. System 750 comprises a folded Tele camera 700 with an image sensor 702, a lens module 704, an adaptive aperture 706 and an OPFE 708. An AA forming mechanism 710 comprises AA blades 712 (as shown e.g. in FIGS. 3-6) and one or more AA actuators 714. The AA actuator(s) is/are mechanically coupled to the AA blades and may be realized by deploying actuator technologies such as voice coil motor (VCM), stepper motor, or shaped memory alloy (SMA) actuator technologies. Position sensors (e.g. Hall sensors, not shown in FIG. 7) may be part of the actuator. A human machine interface (HMI) 716 allows a human user to choose specific AA settings, which are passed as specific control commands to AA mechanism 710. In an embodiment, the human user may choose a specific imaging mode out of some possible imaging modes which are saved in a processing unit or "processor" 718 (e.g. a CPU or an application processor). In this case, processing unit 718 receives the human user input, optionally determines some optimized settings based on the human user input, and passes this information as specific control commands to AA mechanism 710. In another embodiment, processor 718 may determine optimized adaptive aperture settings e.g. based on the available scene information, on object detection algorithms, or on typical human user behavior, and pass this information as specific control commands to AA mechanism 710.

System 750 may be included in an electronic mobile device (not shown) such as a smartphone. The Tele camera may be included with one or more additional cameras in a multi-camera. The additional camera(s) may be a Wide camera having a diagonal FOV of e.g. 50-100 degree and/or an Ultra-Wide camera having a diagonal FOV of e.g. 70-140 degree and/or a Time-of-Flight (ToF) camera. To clarify, a multi-camera may include any combination of two or more cameras where one camera is the Tele camera. In some embodiments, one or more of the cameras may be capable to capture image data that can be used to estimate a depth of scene or "scene depth". Scene depth refers to the respective object-lens distance (or "focus distance") between the objects within a scene and system 750. The scene depth may be represented by a RGB-D map, i.e. by a data array that assigns a particular depth value to each RGB pixel (or to each group of RGB pixels). In general, the pixel resolution of a RGB image is higher than the resolution of a depth map.

Image data used for estimating scene depth may be for example:
  Phase detection auto focus (PDAF) data, e.g. from the Tele camera or from an additional camera;
  Stereo image data, e.g. from the Tele camera and from an additional camera;
  Focus stacking visual image data;
  Focus stacking PDAF data;
  Visual image data from the Tele camera and/or from an additional camera (for estimating depth from defocus);
  Visual image data from the Tele camera and/or from an additional camera (for estimating depth from motion);
  Depth data from a ToF camera.

In some embodiments, scene depth may be provided by an application programming interface ("API"), e.g. Google's "Depth API". Knowledge on a scene depth may be desired as of the quadratic dependence of the DOF from the focus distance, i.e. from the depth of the object in focus.

Figure 8:
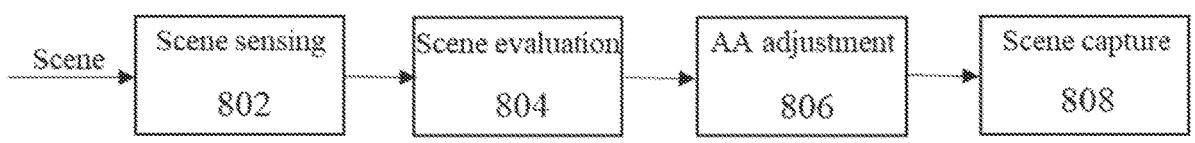
FIG. 8 shows schematically in a flow chart an embodiment of a method disclosed herein.

FIG. 8 presents a flow chart illustrating steps of a method performed in a folded Tele camera with adaptive aperture disclosed herein.

In a scene sensing step 802 the camera's image sensors are used to detect the conditions and properties of a scene (e.g. lightning conditions, scene depth, visual content, etc.), which is done in pre-capture or preview mode. In some embodiments, additional sensor data (e.g. of ToF sensors, temperature sensors, humidity sensors, radar sensors etc.), e.g. of sensors present in the camera hosting device, may be read-out in the scene sensing step 802. Data generated in step 802 is fed into a processor (e.g. CPU, application processor) where a scene evaluation step 804 is executed. In step 804, the data is evaluated with the goal of determining ideal settings for the adaptive aperture, given the input of the human user or a dedicated algorithm. The term "ideal settings" refers here to settings that provide a maximum degree of user experience, e.g. a high image quality, or a high uniformity along stitching borders of panorama images. In case that the camera is operated in a mode highly reliant on automated image capturing, other steps may be performed besides sensor data evaluation. In some examples, ROIs and OOIs may be detected and automatically selected as focus targets by an algorithm in scene evaluation step 804. The ideal settings from step 804 are fed into an AA mechanism such as 710. The AA is set up according to these settings in an aperture adjustment step 806. The scene is then captured in a scene capture step 808. Steps 802 to 806 ensure improved user experience.

In an example, processor 718 calculates control commands concerning the size of the adaptive Tele aperture based on Wide camera image information and/or Tele camera image information, while one or both cameras operate in preview and/or video recording mode. In another example, AA mechanism 710 receives, from the user or from an automated detection method, a desired ROI or OOI, for example where Wide and Tele cameras are focused on, or intend to focus on. The processor 718 detects OOIs or ROIs (for example faces of persons) in a Wide camera image (or alternatively, receives information about OOIs or ROIs detected by another module) by means of dedicated algorithms, and estimates the relative or absolute distance between the objects, for example, by comparing the size of faces or properties of landmarks in each face. The processor then calculates the desired aperture size to keep at least part of said objects of interest in focus, and submits these ideal aperture settings to AA mechanism 710, which configures the adaptive Tele aperture to this aperture size.

In another example, control software running on processor 718 calculates a depth map of part of the scene (or alternatively, receives such a depth map calculated by another module), for example, based on stereo information between a Wide camera image and a Tele camera image, or based on information from phase detection autofocus (PDAF) pixels in the Wide camera sensor, or based on a ToF camera. A dedicated algorithm running on processor 718 determines the required range of distances to be in focus from the depth map, and calculates the desired aperture size to keep at least some of the OOIs in focus. The information is transmitted to AA mechanism 710, which configures the adaptive Tele aperture to this aperture size.

In yet another example, the software may take into account the light levels in the scene, by analyzing the Wide camera image and the Tele camera image (for example, by calculating a histogram of intensity levels), or by receiving an estimation for the illumination in the scene (for example, LUX estimation, or the Wide sensor and/or Tele sensor analog gain) and calculates the ideal adaptive Tele aperture size based on the illumination estimation.

In yet another example, the software may receive indications from the user (for example, by switching the camera between different imaging modes, e.g. to a dedicated portrait-mode or stitching mode, or by changing some parameter in the camera application) regarding the required DOF and aperture configuration, and may take this information into account to calculate ideal settings for the adaptive Tele aperture size to fulfill these requirements.

In yet another example with the folded Tele camera being a scanning folded camera with an adjustable FOV, when operating the camera in a scanning mode, i.e. capturing Tele camera images having different FOVs and stitching the Tele camera images together to create an image with a larger FOV (as e.g. for a high resolution panoramic image), for example as described in U.S. provisional patent application 63/026,097, software running on processor 718 determines the ideal adaptive Tele aperture size before scanning starts and updates this value throughout the scanning and capturing of the images to be stitched. This may be desired e.g. for achieving a similar DOF for all captured Tele images or to achieve similar lightning for all captured Tele images.

In yet another example, when operating the camera in a scanning mode and stitching the Tele camera images together to create an image with a larger FOV, for example as described in PCT/IB2018/050988, software running on processor 718 determines the ideal AA in a way such that single Tele images captured with this AA have very similar optical Bokeh, leading to a stitched image with larger FOV and very uniform appearance in terms of Bokeh, including along single Tele image borders.

In yet another example, for supplying an image with Wide camera FOV and Tele camera resolution for specific ROIs or OOIs, the ROIs and OIs are captured by the Tele camera and these Tele images are stitched into the Wide camera image with large FOV. To supply a natural or seamless transition between the two images, software running on processor 718 determines the ideal AA size so that the optical Bokeh of the Tele image to be stitched is very similar to the optical Bokeh of the Wide image.

In yet another example, the adaptive Tele aperture is modified by AA mechanism 710 between two consecutive Tele image captures, (or between two Tele camera preview frames) to obtain two frames of largely the same scene with different depths of field and to estimate depth from the two images, for example by identifying features in one of these images that correspond to features in the other image, comparing the contrast in the local area of the image and based on this, calculating relative depth for the image region. Relevant methods are discussed in "Elder, J. and Zucker, S. 1998. Local scale control for edge detection and blur estimation" and "Depth Estimation from Blur Estimation, Tim Zaman, 2012".

In yet another example, a software running on processor 718 may calculate the ideal AA settings from the distance between the camera and the object that the camera is focused on. For example, Hall sensors provide the information on the focus position. As DOF has a quadratic dependence on the focus distance, and in order to supply sufficient DOF in the image to be captured, the control software may assign smaller AA setting to closer objects and larger AA setting to objects farther away.

In yet another example, the camera may be operated in the native aperture state for high quality Tele images in low light conditions. To achieve the DOF necessary for achieving a crisp appearance of a specific ROI or OOI, an image series may be taken, whereas the focus scans the necessary DOF range and captures an image at each one of the different scan states, a technique known in the art as "focus stacking" to create a "focus stack". In a second (computational) step, the output image may be assembled by stitching the crisp segments of the ROI or OOI from the series of images in a way so that the entire ROI or OOI appears crisp. In some examples, focus stacking may be also used for estimating scene depth.

In conclusion, adaptive apertures and methods of use described herein expand the capabilities of folded Tele cameras to control the amount of light reaching the Tele sensor and the DOF of the Tele image by adapting the camera's f-number. In particular, they provide solutions to problems of very shallow DOF, particularly in more severe cases, for example:

a) when using a scanning camera with a relatively long focal length (for example, the scanning camera in PCT/IB2016/057366);

b) when using a plurality of images captured by a scanning camera such as described in co-owned U.S. provisional patent application No. 63/026,097. For example, using camera with specifications of "camera 1" above for scanning and capturing a scene in the X and Y directions and stitching 9 images together may result in a FOV equivalent to that of a camera with 10 mm EFL. This mix of a larger FOV with a very shallow DOF may result in a non-natural user experience (i.e. user experience that is very different from that of using a single shot of a wide camera)—objects at different distances from the camera will appear blurry over the stitched, larger FOV;

c) when using a Tele camera having an EFL>10 mm and with-capability to focus to close objects ("Macro objects"), it may be desired to adapt the f/#, e.g. for achieving a higher DOF so that a larger part of a Macro object is at focus. Lens designs for such a Macro Tele camera are described in co-owned U.S. provisional patent application No. 63/070,501. Methods relating to such a Macro Tele camera are described in co-owned U.S. provisional patent application No. 63/032,576; and d) when solving focus miss that arises from the very shallow DOF associated with a long focal length folded Tele lens: when the autofocus engine moves the folded Tele lens for focus, a small mismatch in the position of the lens (for example, due to an error in the position sensing mechanism in a closed-loop autofocus actuator of the folded Tele lens) may result in focus miss—i.e. the important object in the scene will not be in-focus.

While the description above refers in detail to adaptive apertures for folded Tele lenses with a cut lens design, it is to be understood that the various embodiments of adaptive apertures and AA mechanisms therefor disclosed herein are not limited to cut lens designs. Adaptive apertures and AA mechanisms therefor disclosed herein may work with, and be applied to, non-cut lens designs (i.e. lenses without a cut).

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that elements.

All patents, patent applications and publications mentioned in this specification are herein incorporated in their entirety by reference into the specification, to the same extent as if each individual patent, patent application or publication was specifically and individually indicated to be incorporated herein by reference. In addition, citation or identification of any reference in this application shall not be construed as an admission that such reference is available as prior art to the present disclosure.

What is claimed is:

1. A system, comprising:
    a folded camera that includes a lens module with a native aperture, the lens module having a height $H_M$;
    an adaptive aperture (AA) located between the native aperture and an optical path folding element; and
    an adaptive aperture forming mechanism for forming the adaptive aperture, wherein the AA forming mechanism includes an actuator and at least two pairs of blades, and wherein the AA forming mechanism has a height $H_{AA}$ not larger than $H_M$.

2. The system of claim 1, wherein the actuator is operative to move the at least two pairs of blades linearly to form the adaptive aperture at a given position.

3. The system of claim 1, wherein the lens module includes a folded Tele lens with a cut lens design.

4. The system of claim 3, wherein the adaptive aperture is not smaller than the native aperture.

5. The system of claim 1, wherein the folded camera is a scanning folded Tele camera.

6. The system of claim 1, wherein the adaptive aperture is not smaller than the native aperture.

7. The system of claim 1, wherein the adaptive aperture is round in a closed position.

8. The system of claim 1, wherein the adaptive aperture is rectangular in a closed position.

9. The system of claim 1, wherein the adaptive aperture is square in a closed position.

10. A system, comprising:
    a folded camera that includes a lens module with a native aperture, the lens module having a height $H_M$;
    an adaptive aperture (AA) located between the native aperture and an optical path folding element; and
    an adaptive aperture forming mechanism for forming the adaptive aperture, wherein the AA forming mechanism includes an actuator and a plurality of pairs of blades, each pair of the plurality operative to form the adaptive aperture at different given positions, and wherein the AA forming mechanism has a height $H_{AA}$ not larger than $H_M$.

11. A system, comprising:
a folded camera that includes a lens module with a native aperture, the lens module having a height $H_M$;
an adaptive aperture (AA) located between the native aperture and an optical path folding element;
an adaptive aperture forming mechanism for forming the adaptive aperture, wherein the AA forming mechanism has a height $H_{AA}$ not larger than $H_M$; and
a processor configured for controlling the AA forming mechanism and the adaptive aperature so that an image captured with the folded camera has a depth of field similar to a depth of field of an image simultaneously captured with a second camera.

12. The system of claim 11, wherein the controlling is based on the lightning conditions of a scene.

13. The system of claim 12, wherein the folded camera includes a sensor for detecting the lightning conditions.

14. The system of claim 12, wherein the lightning conditions are detected with a sensor of a second camera.

15. The system of claim 12, wherein the lightning conditions are detected using an illumination estimation.

16. The system of claim 11, wherein the folded camera is operational to capture objects at object-image distances of less than 50 cm.

17. The system of claim 11, wherein the folded camera is operational to capture objects at object-image distances of less than 25 cm.

18. The system of claim 11, wherein the folded camera is operational to capture objects at object-image distances of less than 15 cm.

19. The system of claim 11, wherein the processor is configured to control the adaptive aperture so that each image captured in a focus stack with the folded camera has a depth of field similar to a depth of field of all other images captured in the focus stack.

20. The system of claim 11, wherein the folded camera is a scanning folded Tele camera.

21. The system of claim 20, wherein the scanning folded Tele camera captures a plurality of images of a scene with different fields of view.

22. The system of claim 21, wherein the processor is configured to control the adaptive aperture so that the plurality of images have similar depth of field.

23. The system of claim 21, wherein the processor is configured to stitch the plurality of images to one or more images having a larger field of view than any single image.

24. A system, comprising:
a folded camera that includes a lens module with a native aperture, the lens module having a height $H_M$;
an adaptive aperture (AA) located between the native aperture and an optical path folding element;
an adaptive aperture forming mechanism for forming the adaptive aperture, wherein the AA forming mechanism has a height $H_{AA}$ not larger than $H_M$; and
a processor configured for controlling the AA forming mechanism based on a scene depth.

25. The system of claim 24, wherein the folded camera includes a sensor for detecting the scene depth.

26. The system of claim 24, wherein the scene depth is detected with a sensor of a second camera.

27. The system of claim 26, wherein the second camera is a Time-of-Flight camera.

28. The system of claim 24, wherein the processor is configured to calculate the scene depth from stereo camera data provided by the folded camera and by a second camera.

29. The system of claim 24, wherein the processor is configured to calculate the scene depth from stereo camera data provided by a second camera and by a third camera.

30. The system of claim 24, wherein the processor is configured to calculate the scene depth by depth from motion estimation, wherein the depth from motion estimation uses image data provided by the folded camera or by a second camera.

31. The system of claim 24, wherein the processor is configured to calculate the scene depth from a plurality of images captured under different adaptive aperture settings.

32. The system of claim 24, wherein the folded camera is a Tele camera and wherein the processor is configured to calculate the scene depth from phase detection autofocus data of the folded Tele camera or from phase detection autofocus data of a second camera.

33. The system of claim 24, wherein the processor is configured to retrieve the scene depth information from an application programming interface.

* * * * *